(12) United States Patent
Moriya et al.

(10) Patent No.: US 7,486,879 B2
(45) Date of Patent: Feb. 3, 2009

(54) IMAGE BLUR CORRECTING DEVICE

(75) Inventors: Chikatsu Moriya, Saitama (JP); Aiko Higurashi, Saitama (JP)

(73) Assignee: Fujinon Corporation, Saitama (JP)

( * ) Notice: Subject to any disclaimer, the term of this patent is extended or adjusted under 35 U.S.C. 154(b) by 505 days.

(21) Appl. No.: 11/123,083

(22) Filed: May 6, 2005

(65) Prior Publication Data

US 2005/0254805 A1    Nov. 17, 2005

(30) Foreign Application Priority Data

| May 11, 2004 | (JP) | .......................... P. 2004-141561 |
| May 17, 2004 | (JP) | .......................... P. 2004-146724 |
| Sep. 21, 2004 | (JP) | .......................... P. 2004-273725 |

(51) Int. Cl.
*G03B 17/00* (2006.01)
*G03B 27/64* (2006.01)

(52) U.S. Cl. .......................... 396/53; 396/55; 348/208.2

(58) Field of Classification Search ................... 396/52, 396/53, 55; 348/208.2; 359/554–557
See application file for complete search history.

(56) References Cited

U.S. PATENT DOCUMENTS 5,734,932 A * 3/1998 Washisu ...................... 396/55

FOREIGN PATENT DOCUMENTS

| JP | 05-323436 | 12/1993 |
| JP | 2001-142103 | 5/2001 |
| JP | 2003-107554 | 4/2003 |

* cited by examiner

*Primary Examiner*—W. B. Perkey
(74) *Attorney, Agent, or Firm*—Harness, Dickey & Pierce

(57) ABSTRACT

To provide an image blur correcting device in which the fluctuation of an image is little and the image blur can be properly corrected relative to the vibration of a wide range of frequency region, an image blur correcting device is provided in which angular velocity signals of a vibration applied to an optical system are obtained from an angular velocity sensor having good drift characteristics and an angular velocity sensor having good frequency characteristics and synthesizing the angular velocity signals by a synthesizing circuit is performed.

8 Claims, 15 Drawing Sheets

IMAGE BLUR CORRECTING DEVICE

FIELD OF THE INVENTION

The present invention relates to an image blur correcting device. Particularly, the present invention relates to an image blur correcting device for correcting (or preventing) an image blur of a camera due to a vibration.

BACKGROUND OF THE INVENTION

As an image blur correcting device of a television camera, devices have been known in which an image blur correcting lens is movably arranged in a plane intersecting at right angles to an optical axis in an optical photographing system, and when a vibration is applied to a camera (the optical photographing system of the camera), the image blur correcting lens is driven by an actuator so that an image blur due to the vibration is cancelled so as to correct the image blur (for instance, see JP-A-2001-142103 and JP-A-2003-107554). In such image blur correcting devices, the vibration applied to the camera is detected by, for instance, an angular velocity sensor, and an angular velocity signal obtained from the angular velocity sensor is integrated to obtain a quantity of displacement of the image blur correcting lens for eliminating the image blur and to drive the image blur correcting lens.

Further, Japanese Patent No. 3186219 proposes an image blur correcting device in which an angular velocity signal outputted from an angular velocity sensor is obtained through a high-pass filter (HPF) to remove a direct current component included in the angular velocity signal or a low frequency component that results from drift characteristics of the sensor by the HPF. In this image blur correcting device, a proposal is made that a cut-off frequency of the HPF or a cut-off frequency of an integrator (a low-pass filter) for integrating the angular velocity signal is changed in accordance with circumstances. Thus, when a shooting composition changing operation such as a pan/tilt operation is not carried out, the cut-off frequency of the HPF or the integrator is set to a low frequency to effectively correct an image blur with respect to the vibration of a frequency (1 Hz to about 12 Hz) upon jiggling a hand. On the other hand, when the shooting composition changing operation is carried out, the cut-off frequency of the HPF or the integrator is changed to a high frequency so that an effect of correcting the image blur for the shooting composition changing operation is reduced or nullified. That is, when the shooting composition changing operation is performed, a follow-ability of an angle of view thereto is improved.

A gyro sensor known as the angular velocity sensor has a characteristic called a drift that an output varies with time even under a static condition, and a phenomenon has been known that noise of a low frequency is generated due to the drift characteristic. As an ideal angular velocity sensor that is used for correcting the image blur, such factors as described below are exemplified. That is, the noise of the low frequency is small and the frequency characteristic is good (having no phase lag) to a vibration as high as 1 to 30 Hz that is generally considered to be an object to be corrected.

However, in the actual angular velocity sensors, an angular velocity sensor good in its frequency characteristic (phase characteristic) has a feature that noise in the low frequency is large (has much drift). Conversely, an angular velocity having small noise (little drift) in the low frequency has a feature that its frequency characteristic is bad (having a large phase lag in a high frequency). Therefore, preferable characteristics are hardly obtained in an entire frequency region in which the image blur is to be corrected. The former can be said to be the angular velocity sensor (an angular velocity sensor good in its frequency characteristic) excellent in its characteristic of an output signal with respect to the vibration of a higher frequency region. The latter can be said to be the angular velocity sensor (an angular velocity sensor good in its drift characteristic) excellent in its characteristic of an output signal with respect to the vibration of a lower frequency region.

When the angular velocity good in its drift characteristic is used to correct the image blur, the influence of the drift is little, however, the phase lag needs to be compensated for. Accordingly, the increase of a gain resulting therefrom inconveniently causes the vibration in the higher frequency region to be excessively corrected.

On the other hand, when the angular velocity sensor good in its frequency characteristic is used to correct the image blur, since the phase lag is little, even when the phase lag is compensated for, an excessive correction rarely arises, so that a problem hardly occurs. However, since the drift is large, even a state having no vibration is erroneously recognized to have the generation of a vibration. Thus, the correction of the image blur is undesirably carried out. As a result, the image moves (what is called a "fluctuation"), so that a stable image cannot be undesirably obtained. Particularly, in a photographing lens used for a television broadcasting, the high magnification of zoom is advanced. When the zoom magnification is high, the fluctuation is more outstanding. Accordingly, to prevent the drift is an important problem. When the signal component of the drift is removed by the high-pass filter, the frequency region of the drift is partially overlapped on the frequency region of the vibration as an object for correcting the image blur, and accordingly, the signal component of the vibration is removed together with the signal component of the drift. Thus, the image blur is not undesirably properly corrected with respect to the vibration of the removed frequency range.

SUMMARY OF THE INVENTION

Photographing states (or shooting states) include a case in which a shooting is carried out under a fixed shooting composition and a case in which a shooting is carried out while a shooting composition is changed by a camera work such as a pan/tilt operation. By considering such shooting states, when the cut-off frequency of the HPF or the integrator is changed as described in Japanese Patent No. 3186219 to change characteristics (image blur correcting characteristics) for correcting the image blur, the correction of the image blur adapted to the shooting state can be effectively carried out. As described above, when the image blur correcting characteristics are changed in accordance with the shooting state, since the frequency region of the vibration (the angular velocity signal from the angular velocity sensor) preferentially taken as the object for correcting the image blur respectively is different respectively in the image blur correcting characteristics, for instance, the lower frequency region and the higher frequency region. Accordingly, an angular velocity sensor adapted to the image blur correcting characteristics of either of the lower frequency region and the higher frequency region can be selected even from currently marketed angular velocity sensors with adequate characteristics.

Under these circumstances, an object of an illustrative, non-limiting embodiment of the invention is to provide an image blur correcting device in which the fluctuation of an image due to the drift of a vibration sensor such as an angular velocity sensor for detecting a vibration is little and a good correction of the image blur can be carried out with respect to the vibration of a frequency in a wide range.

Another object of an illustrative, non-limiting embodiment of the present invention is to provide an image blur correcting device that can correct the image blur by using a vibration detecting sensor with characteristics suitable for obtaining image blur correcting characteristics when the image blur correcting characteristics are changed in accordance with shooting states.

In order to achieve the above-described objects, an image blur correcting device of the present invention includes: an optical system for forming an image; a vibration signal output unit for outputting a vibration signal corresponding to a vibration applied to the optical system; an image displacing unit for displacing the image; and an image blur correcting unit for controlling the image displacing unit based on the vibration signal outputted from the vibration signal output unit so that the image displacing unit displaces (or shifts) the image so as to cancel (or cancel) a blur of the image, the blur resulting from the vibration applied to the optical system. The vibration signal output unit includes: a first vibration sensor for detecting a first vibration of a lower frequency region in an entire frequency region of the vibration applied to the optical system, and outputting the vibration signal including a first vibration signal corresponding to the first vibration; a second vibration sensor for detecting a second vibration of a higher frequency region in the entire frequency region of the vibration applied to the optical system and for outputting the vibration signal including a second vibration signal corresponding to the second vibration; and a signal synthesizing unit for obtaining the first vibration signal from the first vibration sensor, obtaining the second vibration signal from the second vibration sensor, and synthesizing the vibration signal from the first and second vibration signals, the vibration signal corresponding to the entire frequency region of the applied to the optical system.

According to the present invention, since the vibration signals of the lower frequency region and the higher frequency region can be obtained by using the vibration sensors having different characteristics, the vibration signal that includes no signal component of a drift and has a suitable response to the vibration of the frequency in a wide range can be obtained by using the vibration sensor having excellent characteristics in each of the frequency regions.

In the image blur correcting device according to the present invention, each of the first and second vibration sensors is an angular velocity sensor that outputs an angular velocity signal as the vibration signal, the angular velocity signal showing an angular velocity of the vibration applied to the optical system. When the first vibration sensor is compared with the second vibration sensor, the first vibration sensor has less drift and a worse frequency characteristic in the higher frequency region, and the second vibration sensor has more drift and a better frequency characteristic in the higher frequency region. In the present invention, when the first and second vibration sensors are angular velocity sensors, the angular velocity sensors may have the above-described preferable characteristics.

In the image blur correcting device according to the present invention, the image-displacing unit displaces an image blur correcting lens (or an image blur preventing lens) disposed in the optical system so as to displace the image. That is, the present invention can be applied to an image blur correcting device in which the image blur is optically corrected by the image blur correcting lens.

For achieving the above-described objects, an image blur correcting device according to the present invention includes: an optical system for forming an image; a vibration signal output unit for outputting a vibration signal corresponding to a vibration applied to the optical system; an image displacing unit for displacing the image; and an image blur correcting unit for controlling the image displacing unit based on the vibration signal outputted from the vibration signal output unit so that the image displacing unit displaces the image so as to cancel a blur of the image, the blur resulting from the vibration applied to the optical system. The vibration signal output unit includes first and second vibration sensors for outputting the vibration signal corresponding to the vibration applied to the optical system, wherein when the first vibration sensor is compared with the second vibration sensor, the first vibration sensor has less drift and a worse frequency characteristic in a higher frequency region of the vibration applied to the optical system, and the second vibration sensor has more drift and a better frequency characteristic in the higher frequency region. The vibration signal output unit further includes: a signal synthesizing unit for obtaining a first vibration signal from the first vibration sensor, the first vibration signal corresponding to a vibration of a lower frequency region than a switching frequency, for obtaining a second vibration signal from the second vibration sensor, the second vibration signal corresponding to a vibration of a higher frequency region than the switching frequency, and for synthesizing the vibration signal from the first and second vibration signal, the vibration signal corresponding to an entire frequency region of the vibration applied to the optical system; and a cut-off frequency changing unit for changing the cut-off frequency in the signal synthesizing unit.

According to the present invention, the vibration signal of the lower frequency region is obtained from the vibration sensor having a better drift characteristic (i.e., less drift) and obtains the vibration signal of the higher frequency region from the vibration sensor having a better frequency characteristic in the higher frequency region and the obtained vibration signals are synthesized to form the vibration signal of the entire frequency region of the vibration. Accordingly, the vibration signal that has little drift and is good in its frequency characteristic can be obtained. Particularly, when the vibration signals outputted from the first and second vibration sensors are synthesized, the switching frequency for dividing the frequency region of the vibration signal formed into the lower frequency region and the higher frequency region can be changed. Consequently, a more suitable vibration signal can be synthesized depending on the state of the vibration.

In the image blur correcting device according to the present invention, the switching frequency-changing unit changes the switching frequency on the basis of a magnitude of the vibration applied to the optical system. Which of the drift characteristic and the frequency characteristic is preferentially taken as a preferable characteristic of the vibration sensor is different depending on the magnitude of the vibration. Accordingly, in the present invention the switching frequency can be changed on the basis of the magnitude of the vibration.

In the image blur correcting device according to the present invention, the switching frequency-changing unit detects the magnitude of the vibration applied to the optical system on the basis of the vibration signal obtained from the first vibration sensor. To detect the magnitude of the vibration, the vibration signal of the first vibration sensor having little drift is more properly employed to decide the magnitude.

In the image blur correcting device according to the present invention, the switching frequency changing unit decides which the magnitude of the vibration applied to the optical system is a magnitude evaluated to have no vibration or a magnitude evaluated to have a vibration. In the case of the magnitude evaluated to have no vibration, the switching frequency is made to be higher as compared with the magnitude decided to have a vibration. In the case of the magnitude decided to have no vibration, it is important to generate no drift. Accordingly, in the present invention the vibration signal from the first vibration sensor having little drift in wide range of the frequency region can be effectively used.

In the image blur correcting device according to the present invention, the image-displacing unit displaces an image blur correcting lens disposed in the optical system so as to displace the image. The present invention can employ an optical correction using the image blur correcting lens as a system for correcting the image blur.

In order to achieve the above described objects, an image blur correcting device includes: an optical system for forming an image; a vibration signal output unit for outputting a vibration signal corresponding to a vibration applied to the optical system; an image displacing unit for displacing the image; and an image blur correcting unit for controlling the image displacing unit based on the vibration signal outputted from the vibration signal output unit so that the image displacing unit displaces the image so as to cancel a blur of the image, the blur resulting from the vibration applied to the optical system. The image blur correcting device further includes a mode switching unit for selecting between a mode upon fixing a shooting composition (i.e., a fixing shooting composition mode) and a mode upon changing the shooting composition (i.e., a changing shooting composition mode), wherein the fixing shooting composition mode is a mode in which a frequency region for effectively correcting the image blur by the image blur correcting unit and the image displacing unit includes a lower frequency region, and the changing shooting composition mode is a mode in which the frequency region does not the lower frequency region. The vibration signal output unit includes: a second vibration detecting sensor (i.e., a second vibration sensor) excellent in an output characteristic of a second vibration signal corresponding to a vibration of a higher frequency region in a entire frequency region of the vibration applied to the optical system; a first vibration detecting sensor (i.e., a first vibration sensor) excellent in an output characteristic of a first vibration signal corresponding to a vibration of a lower frequency region in the entire frequency region of the vibration applied to the optical system; and a sensor switching unit for selecting the second vibration detecting sensor when the changing shooting composition mode is selected by the mode switching unit, and for selecting the first vibration detecting sensor when the fixing shooting composition mode is selected by the mode switching unit.

According to the present invention, the mode can be switched to the fixing shooting composition mode in which a characteristic for correcting an image blur (an image blur correcting characteristic) is suitable for a shooting state (or a photographing state) in which a shooting operation (or a photographing operation) is mainly performed by fixing the shooting composition without changing the shooting composition and to the changing shooting composition mode in which the image blur correcting characteristic is suitable for a shooting state in which the shooting operation is mainly carried out by changing the shooting composition. The vibration detecting sensors having the different characteristics respectively adapted to the modes are properly used. Thus, the vibration detecting sensor adapted to the image blur correcting characteristic suitable for each shooting state (each mode) can be used to correct the image blur and desired image blur correcting characteristic can be properly obtained.

In the image blur correcting device according to the present invention, the first vibration detecting sensor and the second vibration-detecting sensor are angular velocity sensors that output angular velocity signals showing the angular velocity of the vibration applied to the optical system. That is, in the present invention, the angular velocity sensors are used as the vibration detecting sensors.

In the image blur correcting device according to the present invention, when the first vibration detecting sensor is compared with the second vibration detecting sensor, the second vibration detecting sensor has a larger noise in the lower frequency region, however, is excellent in its phase characteristic in the higher frequency region (i.e., the sensor having more drift and a better frequency characteristic in the higher frequency region), and the first vibration detecting sensor is inferior in its phase characteristic in the higher frequency region, however, has small noise in the lower frequency region (the sensor having less drift and a worse frequency characteristic in the higher frequency region). That is, the current vibration-detecting sensor such as the angular velocity sensor can be roughly classified into two kinds. The sensor that has large noise in the lower frequency region, however, is excellent in its phase characteristic in the higher frequency region serves as the second vibration detecting sensor excellent in its characteristic in the higher frequency region that is effectively used in the changing shooting composition mode. The sensor that is inferior in its phase characteristic in the higher frequency region, however, has small noise in the lower frequency region serves as the first vibration detecting sensor excellent in its characteristic in the lower frequency region that is effectively used in the fixing the shooting composition mode.

In the image blur correcting device according to the present invention, the mode-switching unit decides whether a shooting composition changing operation is carried out or not based on the vibration signal obtained from the vibration signal output unit. When the mode-switching unit decides that the shooting composition changing operation is not carried out, the mode-switching unit selects the fixing shooting composition mode. When the mode-switching unit decides that the shooting composition changing operation is carried out, the mode-switching unit selects the changing shooting composition mode. In the present invention, the image blur correcting characteristics in the fixing shooting composition mode and the changing shooting composition mode, and the vibration detecting sensors adapted to the modes can be automatically switched depending on whether the shooting composition changing operation such as a pan/tilt operation is carried out or not.

In the image blur correcting device according to the present invention, the mode-switching unit selects the fixing shooting composition mode or the changing shooting composition mode by operating a switch. In the present invention, the image blur characteristics in the fixing shooting composition mode and the changing shooting composition mode, and the vibration detecting sensors adapted to the modes are switched in accordance with the operation of the switch by a user.

In the image blur correcting device according to the present invention, the mode switching unit switches the fixing shooting composition mode or the changing shooting composition mode by operating the switch, and decides in accordance with the vibration signal obtained from the vibration signal output unit whether the shooting composition changing operation is carried out or not. When the mode-switching unit decides that the shooting composition changing operation is carried out, the mode-switching unit stops the correction of the image blur by the image vibration-correcting unit and the image-displacing unit. In the present invention, the image blur correcting characteristics in the fixing shooting composition mode and the changing shooting composition mode, and the vibration detecting sensors adapted to the modes are switched in accordance with the operation of the switch by the user. When it is detected that the shooting composition changing operation such as the pan/tilt operation is carried out, the correction of the image blur is stopped.

In the image blur correcting device according to the present invention, the fluctuation of the image due to the drift of the vibration sensor is reduced and the image blur can be preferably prevented with respect to the vibration of a wide range of frequency.

Further, in the image correcting device according to the present invention, the image blur correcting characteristic can be changed to preferable image blur correcting characteristic in accordance with the shooting state. Still further, the vibration detecting sensor having characteristics suitable for obtaining each of the image blur characteristics can be used to correct the image blur.

DETAILED DESCRIPTION OF THE INVENTION

An exemplary embodiment of an image blur correcting device according to the present invention will be described in detail below by referring to the accompanying drawings.

FIRST EMBODIMENT

Figure 1:
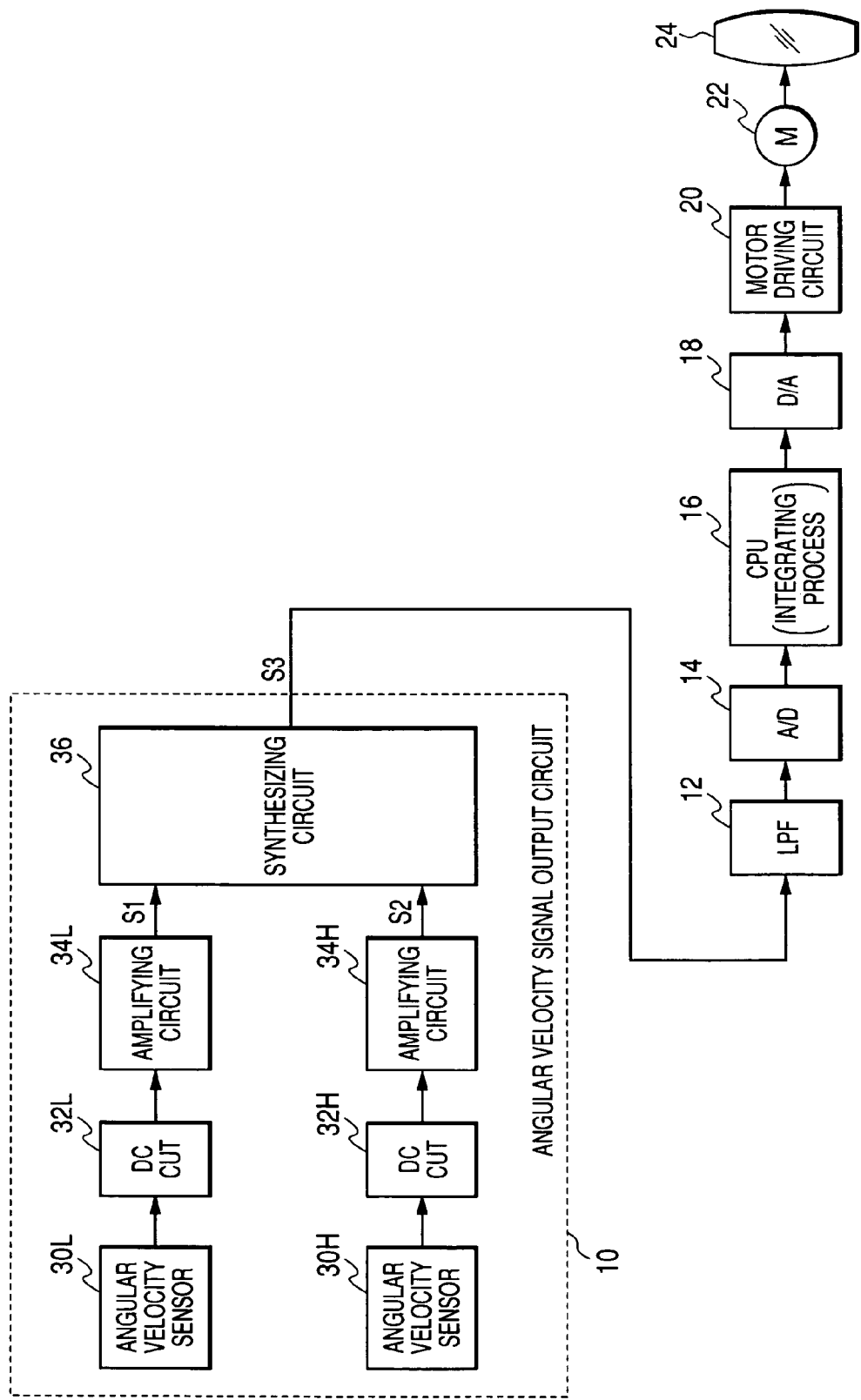
FIG. 1 is a block diagram showing the inner structure of an image blur correcting device according to an illustrative, non-limiting embodiment of the present invention.

FIG. 1 is a block diagram showing the inner structure of an image blur correcting device according to an exemplary embodiment of the present invention. The image blur correcting device is mounted on, for instance, a lens device (a shooting or photographing lens) for a television camera, a movie camera or a still camera or the like. An image blur correcting lens 24 shown in FIG. 1 is disposed so as to be movable upward and downward (a vertical direction) and rightward and leftward (a horizontal direction) in a plane perpendicular to an optical axis in an optical system such as the lens device or the camera on which the image blur correcting device is mounted. The image blur correcting lens 24 is driven in the vertical direction or the horizontal direction by a motor 22. When a vibration is generated in the camera (the optical system), the image blur correcting lens is moved to a position for correcting an image blur (a position for cancel (or counteract) the image blur due to the vibration) by the motor 22. Since the image blur correcting lens 24 is driven in the same mariner in any of the vertical direction and the horizontal direction on the basis of the vibration generated in each of the directions, only the structure for correcting the image blur relative to one direction (for instance, the horizontal direction) is shown in FIG. 1. Thus, it is assumed that a structure for correcting the image blur with respect to the other direction has the same structure as described above.

An angular velocity signal output portion 10 (i.e., a vibration signal output portion) shown in FIG. 1 is a component for detecting the angular velocity of the vibration generated in the optical system and outputting the signal (an angular velocity signal) of the detected angular velocity. As described below in detail, for instance, the rightward and leftward vibrations, that is, the horizontal vibrations of the optical system, are detected by two angular velocity sensors 30L and 30H having different characteristics and an angular velocity signal S3 synthesized from angular velocity signals respectively outputted from the angular velocity sensors 30L and 30H is outputted.

In the angular velocity signal S3 outputted from the angular velocity signal output portion 10, a frequency component higher than a frequency range as an object for which the image blur is corrected is cut off by a low-pass filter (LPF) 12. Then, the angular velocity signal in which the frequency component is cut off is converted to a digital signal by an A/D converter 14 and the digital angular velocity signal S3 is inputted to a CPU 16.

The CPU 16 is an image blur correcting portion to integrate the inputted angular velocity signal S3 by a computing process equal to a digital filter and convert the angular velocity signal S3 to an angle signal. That is, a quantity of displacement (a quantity of displacement from a reference position) of the image blur correcting lens 24 for displacing the image in accordance with such a direction and a magnitude as to cancel the image blur generated due to the vibration of the optical system is obtained by integrating the angular velocity signal S3. Then, a value of the angle signal is outputted as a value showing a movement target position of the image blur correcting lens 24.

The angle signal outputted from the CPU 16 is converted to an analog signal by a D/A converter 18 and inputted to a motor driving circuit 20. The motor driving circuit 20 functions as an image displacing portion to drive the motor 22 for moving the image blur correcting lens 24, for instance, rightward and leftward and move the image blur correcting lens 24 to a position corresponding to the value of the angle signal outputted from the CPU 16. Thus, the image blur due to the vibration applied to the optical system is corrected. As systems for correcting the image blur, not only an example in which the image blur due to the vibration is cancelled by an image displacing unit for displacing the image blur correcting lens 24 to intentionally displace the image of the optical system as in this embodiment, but also various systems have been known. The various systems include a system in which the image blur due to the vibration is cancelled by an image displacing unit for displacing an imaging element of a camera to intentionally displace the image or a system in which the image blur is not corrected by an optical image displacing unit and the image blur due to the vibration is cancelled by an electronic image displacing unit for displacing a range cut off as a recording or reproducing image signal from the range of a image that is taken by the imaging element of a camera to intentionally displace the image. In the correction of the image blur by the above-described other systems, the angular velocity signal obtained from the angular velocity signal output portion 10 is likewise integrated so that a signal of a quantity of displacement (corresponding to the angle signal) for displacing the image by the image displacing unit so as to cancel the image blur due to the vibration can be obtained like this embodiment. The present invention can be applied to the other systems for correcting the image blur in the same way as that of this embodiment.

Subsequently, the angular velocity signal output portion 10 will be described in detail. The two angular velocity sensors 30L and 30H for detecting the vibration of the optical system are, for instance, gyro sensors and installed on the upper surfaces of lens barrels. From each of the angular velocity sensors 30L and 30I, an electric signal of voltage corresponding to angular velocity of the vibration generated, for example, rightward and leftward of the lens barrel is outputted as the angular velocity signal.

As the two angular velocity sensors 30L and 30H, the angular velocity sensors having different characteristics are used. As the angular velocity sensor 30L, a sensor is used that has less drift and worse frequency characteristics (an angular sensor superior in its drift characteristics, that is, an angular velocity sensor excellent in its characteristics of an output signal corresponding to a vibration of a lower frequency region). As the angular velocity sensor 30H, a sensor is used that has more drift and better frequency characteristics (an angular velocity sensor superior in its frequency characteristics, that is, an angular velocity sensor excellent in its characteristics of an output signal corresponding to a vibration of a higher frequency region).

Figure 2A:
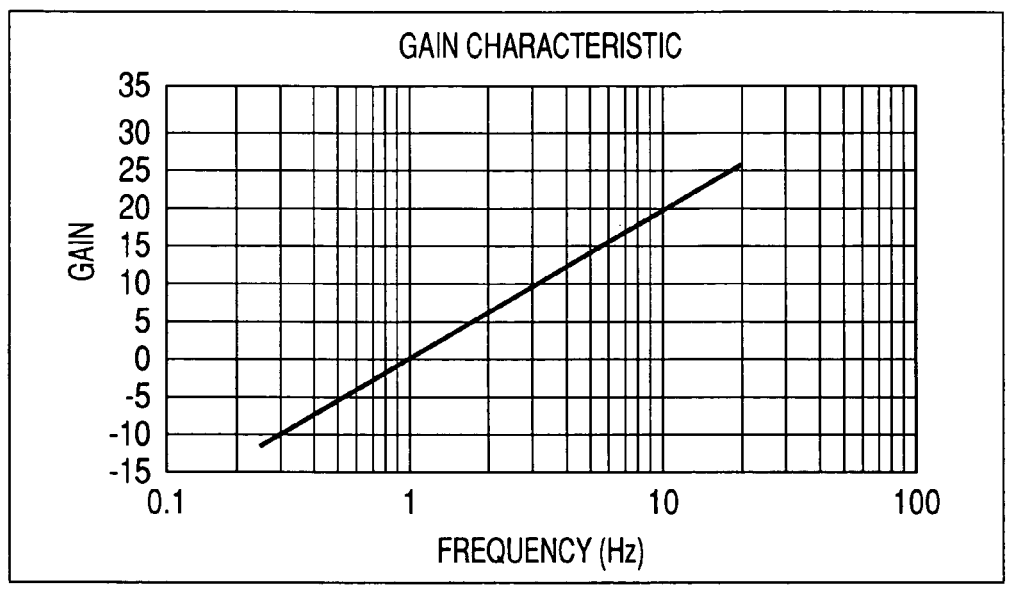
FIGS. 2A and 2B are characteristic view in which the frequency characteristics of two angular velocity sensors used for detecting a vibration are compared with each other.
Figure 2B:
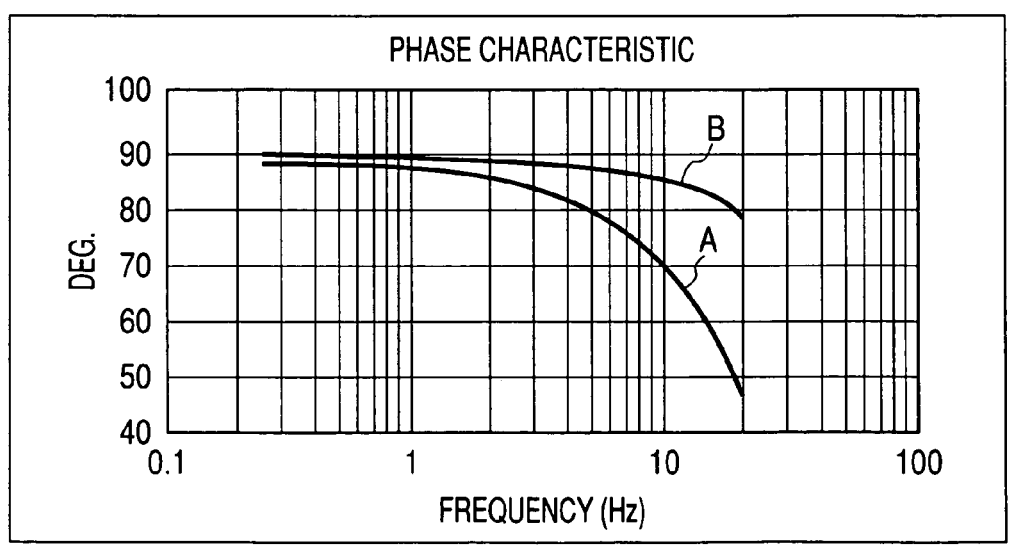

FIGS. 2A and 2B are a characteristic view in which the frequency characteristics of the angular velocity sensors 30L and 30H are compared with each other. FIG. 2A shows the frequency characteristics (gain characteristics) relative to a gain. Both the angular velocity sensors 30L and 30H show substantially corresponding characteristics concerning the gain characteristics. On the other hand, FIG. 2B shows the frequency characteristics (phase characteristics) relative to a phase. A curve A shows the phase characteristics of the angular velocity sensor 30L and a curve B shows the phase characteristics of the angular velocity sensor 30H. As can be understood from the comparison of the curve A with the curve B, the angular velocity sensor 30H has no phase lag and shows the better phase characteristics even in the higher frequency region. As compared therewith, in the angular velocity sensor 30L, a phase lag is outstandingly increased and the phase characteristics are worse in regions where the frequency is higher.

As for drift characteristics that do not appear in the characteristic views, the angular velocity sensor 30L has a drift lower than that of the angular velocity sensor 30H and shows better characteristics.

As shown in FIG. 1, the angular velocity signals respectively outputted from the angular velocity sensors 30L and 30H have direct current components respectively removed by DC cut portions 32L and 32H, amplified by amplifying circuits 34L and 34H and inputted to a synthesizing circuit (i.e., a signal synthesizing portion) 36. The angular velocity signal obtained from the angular velocity sensor 30L is designated by S1 and the angular velocity signal obtained from the angular velocity sensor 30H is designated by S2.

In the synthesizing circuit 36 divides, a frequency region is divided into two frequency regions including a lower frequency region fL and a higher frequency region by taking a frequency as a boundary. With respect to the angular velocity signals S1 and S2, the synthesizing circuit 36 obtains the signal component of the lower frequency region fL from the angular velocity signal S1 of the angular velocity sensor 30L having better drift characteristics and the signal component of the higher frequency region fH from the angular velocity signal S2 of the angular velocity sensor 30H having better frequency characteristics. The synthesizing circuit 36 synthesizes an angular velocity signal S3 of an entire frequency region. In the angular velocity signal S3 synthesized as described above, since the signal component of the lower frequency region fL in which the signal component of a drift may possibly appear is formed by the angular velocity signal S1 obtained from the angular velocity sensor 30L superior in its drift characteristics, a variation of voltage due to the drift hardly occurs. Further, the angular velocity signal S1 obtained from the angular velocity sensor 30L having worse frequency characteristics is effectively used only in the lower frequency region fL. Accordingly, the frequency characteristics in the lower frequency region fL are improved. On the other hand, since the signal component of the higher frequency region fH is formed by the angular velocity signal S2 obtained from the angular velocity sensor 30H superior in its frequency characteristics, the frequency characteristics in the higher frequency region fH are good.

Accordingly, the angular velocity signal S3 synthesized by the synthesizing circuit 36 and outputted to the LPF 12 from the angular velocity signal output portion 10 as described above is equal to an angular velocity signal obtained from an ideal angular velocity sensor having little drift and good frequency characteristics.

Figure 3:
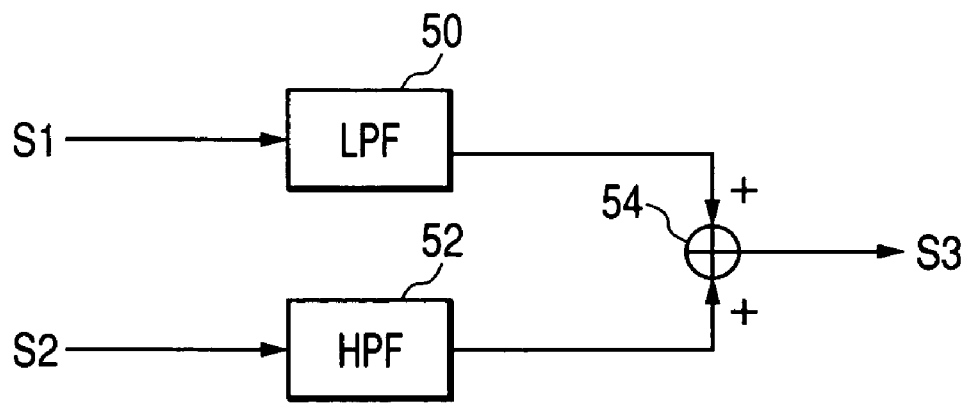
FIG. 3 is a block diagram showing one example of a synthesizing circuit in an angular velocity signal output portion.
Figure 4:
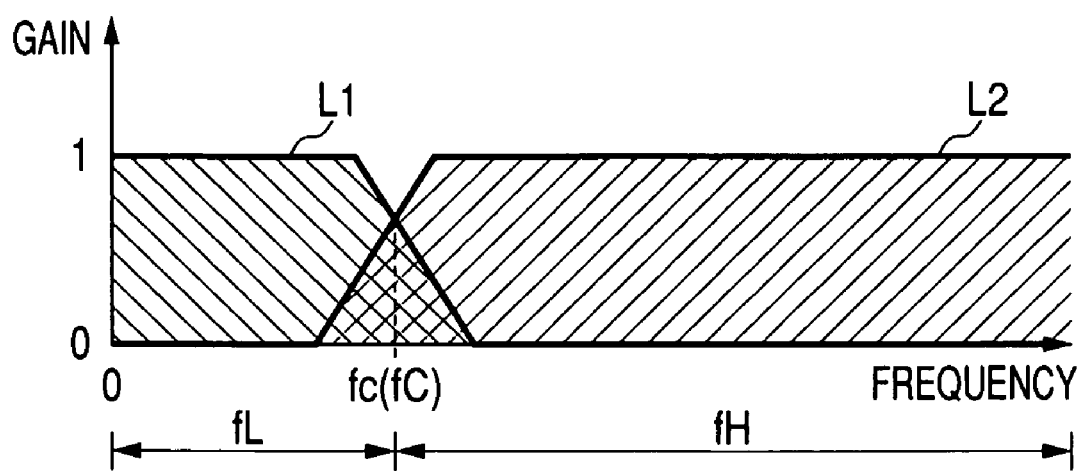
FIG. 4 shows the filter characteristic of the synthesizing circuit.

One example of the synthesizing circuit 36 is shown in FIG. 3. As shown in FIG. 3, the angular velocity signal S1 inputted to the synthesizing circuit 36 from the angular velocity sensor 30L has the signal component of the higher frequency region fH cut off by a low-pass filter (LPF) 50 to extract only the signal component of the lower frequency region fL. On the other hand, the angular velocity signal S2 inputted to the synthesizing circuit 36 from the angular velocity sensor 30H has the signal component of the lower frequency region fL cut off by a high-pass filter (HPF) 52 to extract only the signal component of the higher frequency region fH. FIG. 4 shows the frequency characteristics of the LPF 50 and the HPF 52. The characteristics of the LPF 50 are represented by a graph L1 and the characteristics of the HPF 52 are represented by a graph L2. The characteristics of the LPF 50 and the HPF 52 are set so that the gain of the synthesizing circuit 36 having the total of the LPF 50 and the HPF 62 is uniform (1) to all the signal components of the entire frequency region. For instance, the cut-off frequency fc of the LPF 50 corresponds to the cut-off frequency of the HPF 52 and is set to 4 Hz. Assuming that a frequency in which the graph L1 of the LPF 50 intersects the graph L2 of the HPF 52 shows the frequency showing the boundary of the lower frequency region fL and the higher frequency region fH and is referred to as a cross-over frequency fC, in an example shown in FIG. 4, the cross-over frequency fC corresponds to the cut-off frequency fc (for instance, 4 Hz) of the LPF 50 and the HPF 52.

The angular velocity signal S1 in which only the signal component of the lower frequency region fL is extracted by the LPF 50 and the angular velocity signal S2 in which only the signal component of the higher frequency region fH is extracted by the HPF 52 are subsequently inputted to an adder 54 and added (S1+S2). Thus, the angular velocity signal S3 is formed in which the signal component of the lower frequency region fL of the angular velocity signal S1 is combined with the signal component of the higher frequency region fH of the angular velocity signal S2. The angular velocity signal S3 is outputted from the synthesizing circuit 36.

Figure 5:
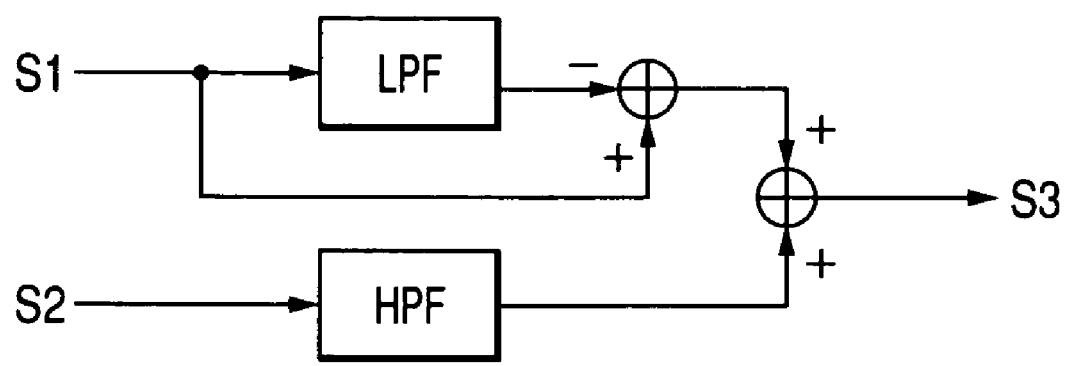
FIG. 5 is a block diagram showing one example of the synthesizing circuit in the angular velocity signal output portion.
Figure 6:
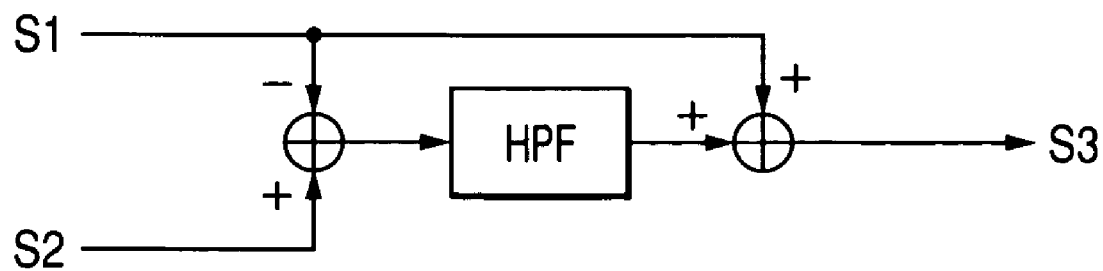
FIG. 6 is a block diagram showing one example of the synthesizing circuit in the angular velocity signal output portion.

The synthesizing circuit 36 shown in FIG. 3 is one example. In other circuit structure, the angular velocity signal S1 can be combined with the angular velocity signal S2 to form the angular velocity signal S3 as shown in FIG. 3. FIGS. 5 and 6 show one examples of the synthesizing circuit 36. The explanation of them is omitted. Both the circuits show modified examples in which the synthesizing circuit 36 shown in FIG. 3 is formed with only HPFs and adders. To the inputs of the angular velocity signals S1 and S2, the same angular velocity signal S3 the same as that of the synthesizing circuit shown in FIG. 3 is consequently synthesized and outputted.

SECOND EMBODIMENT

Figure 7:
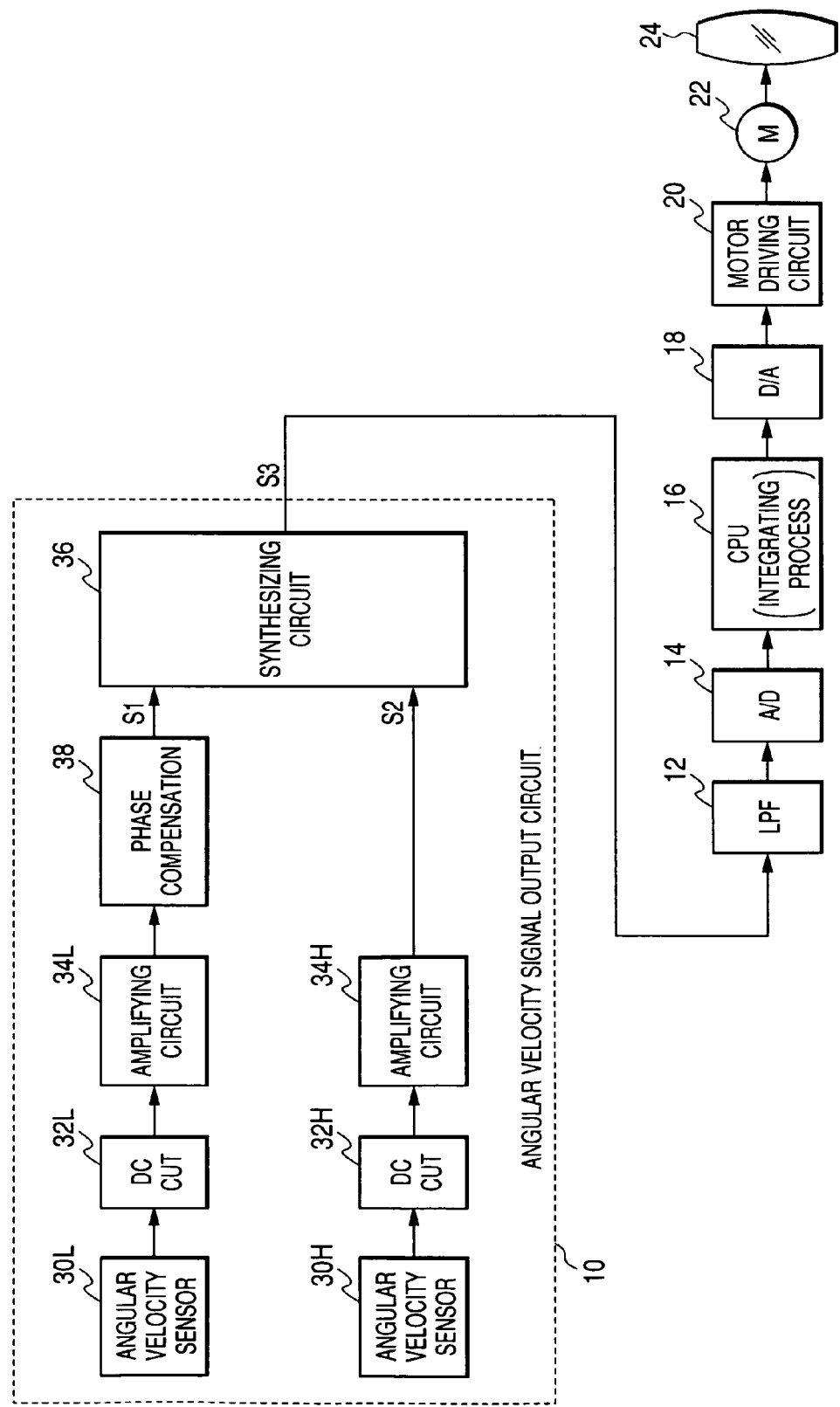
FIG. 7 is a block diagram showing another example of the angular velocity signal output portion.

Another embodiment of the angular velocity signal output portion 10 shown in FIG. 1 will be described below. FIG. 7 is a block diagram showing another exemplary embodiment (a second embodiment) of the angular velocity signal output portion 10. The same components as those of the angular velocity signal output portion 10 shown in FIG. 1 or having similar functions thereof are designated by the same reference numerals and an explanation of them is omitted. As compared with FIG. 1, in FIG. 7, a phase compensation circuit 38 is added to a signal line for processing an angular velocity signal S1 outputted from an angular velocity sensor 30L. This phase compensation circuit 38 is effective when a phase lag in a lower frequency region fL of the angular velocity signal S1 obtained from the angular velocity sensor 30L having bad frequency characteristics cannot be neglected. For instance, a frequency in which a signal component due to a drift is included in the frequency component of an angular velocity signal S2 obtained from an angular velocity sensor 30H is located in the lower frequency region fL. The signal component of the lower frequency region fL is desirably obtained from the angular velocity signal S1 to form a synthesized angular velocity signal S3.

When the boundary (a cross-over frequency fC) of the lower frequency region fL and the higher frequency region fH is set by preferentially taking the above-described condition, the phase lag of the angular velocity signal S1 in the lower frequency region fL may not be possibly neglected. For instance, there is a case in which the frequency characteristics of the angular velocity sensor S1 are bad even in the lower frequency region or a case in which since the signal component of a drift of the angular velocity sensor S2 ranges to a relatively higher frequency region, the cross-over frequency fC needs to be high.

The phase compensation circuit 28 advances the phase of the angular velocity signal S1 from the angular velocity sensor 30L by a quantity corresponding to a frequency to compensate for the phase lag of the angular velocity signal S1. Thus, the frequency characteristics of the synthesized angular velocity signal S3 in the lower frequency region fL are improved.

THIRD EMBODIMENT

Figure 8:
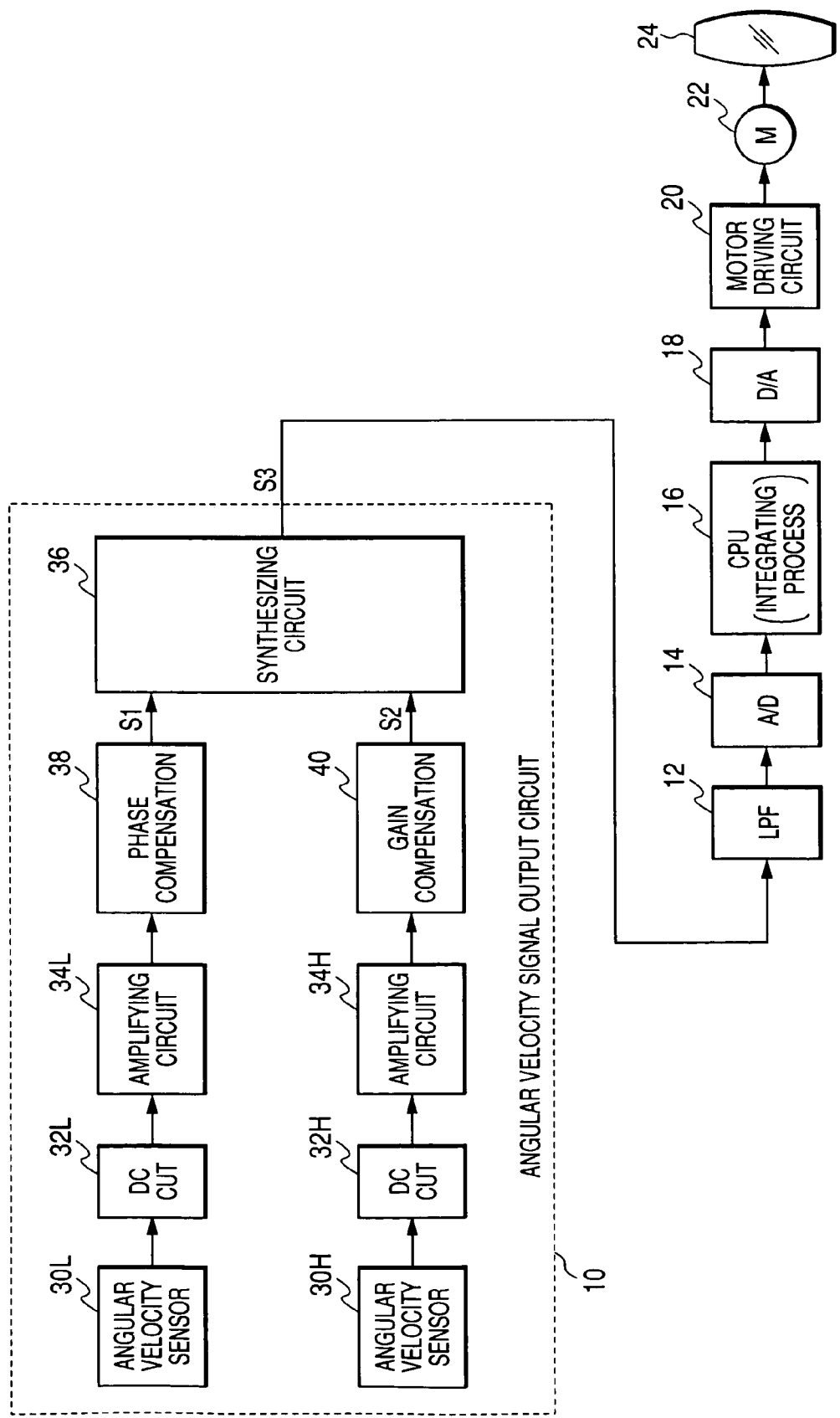
FIG. 8 is a block diagram showing a still another example of the angular velocity signal output portion.

FIG. 8 is a block diagram showing a third exemplary embodiment of the angular velocity signal output portion 10. This embodiment prevents the deterioration of gain characteristics that is generated when the phase compensation circuit 38 is disposed as in the second embodiment. The same components as those of the angular velocity signal output portion 10 shown in FIG. 7 or having similar functions thereof are designated by the same reference numerals and an explanation of them is omitted. Ordinarily, when a phase is compensated for, the gain of a signal is varied along therewith. As compared with the second embodiment shown in FIG. 7, in the third embodiment shown in FIG. 8, a gain compensation circuit 40 is added to a signal line for processing an angular velocity signal S2 outputted from an angular velocity sensor 30H. The gain compensation circuit 40 is especially effective when the phase of an angular velocity signal S1 from an angular velocity sensor 30L is compensated by the phase compensation circuit 38 as in the second embodiment, if the change of the gain along therewith cannot be neglected. For instance, the phase compensation circuit 38 mainly compensates for the phase with respect to a signal component of the frequency component of the angular velocity signal S1 in the vicinity of a boundary (a cross-over frequency fC) of a lower frequency region fL and a higher frequency region fH. When the phase lag of the angular velocity signal S1 in the vicinity of the frequency is very large, the increase of the gain in the vicinity of the frequency is increased so as not to be neglected.

As apparent from the characteristic view shown in FIG. 4, in the vicinity of the cross-over frequency fC, the frequency component of the angular velocity signal S1 is added to the frequency component of the angular velocity signal S2 at the rate to have the signal component of an angular velocity signal S3. Accordingly, the gain of the angular velocity signal S2 is reduced for the gain of the angular velocity signal S1 increased by the phase compensation circuit 38 by the gain compensation circuit 40. Thus, the variation of the gain of the angular velocity signal S1 by the phase compensation circuit 38 is compensated.

FOURTH EMBODIMENT

Figure 9:
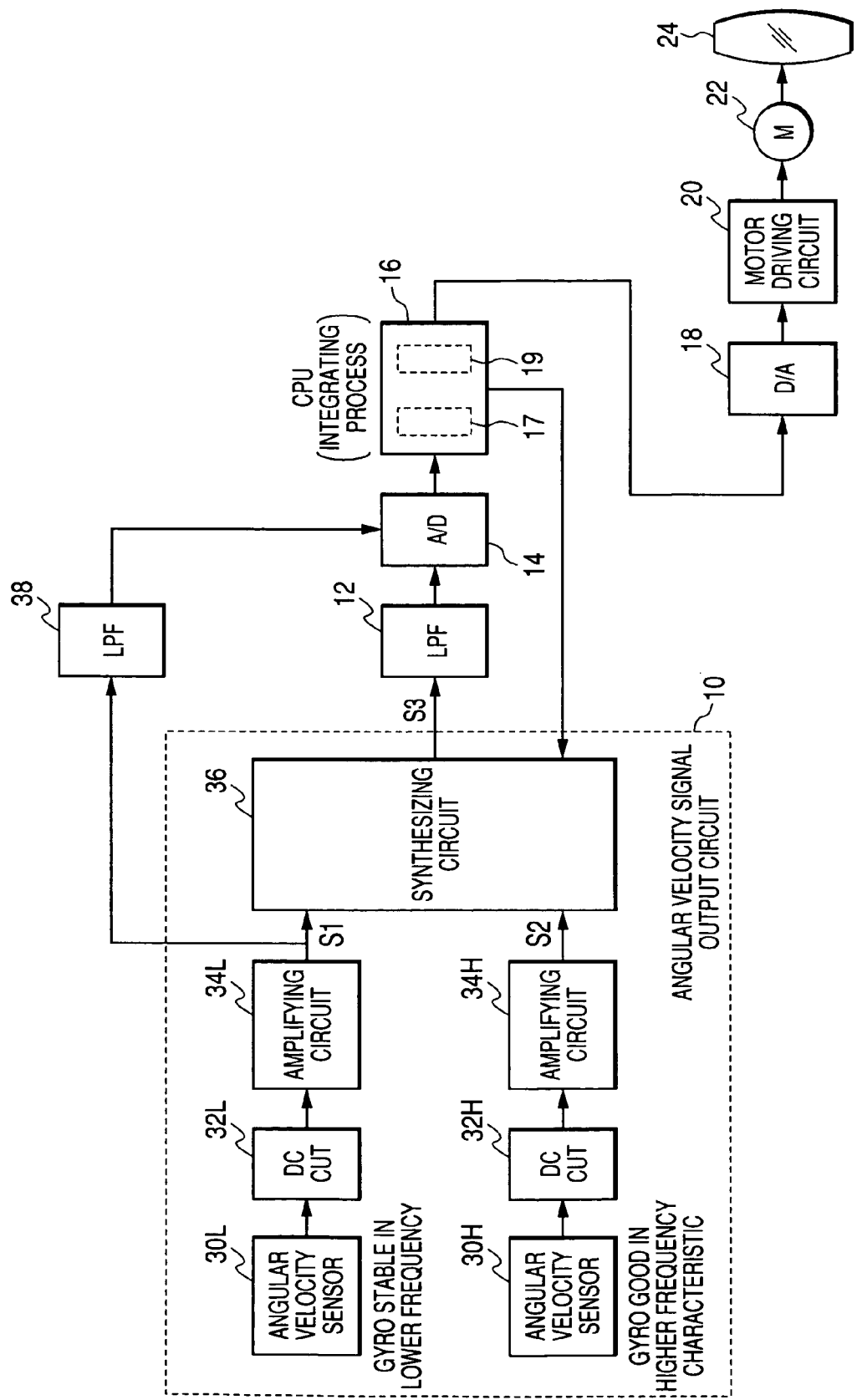
FIG. 9 is a block diagram showing the inner structure of an image blur correcting device according to an illustrative, non-limiting embodiment of the present invention.

FIG. 9 is a block diagram showing an inner structure of another exemplary embodiment (a fourth embodiment) of the image blur correcting device according to the present invention. The same components as those shown in FIG. 1 or having similar functions thereof are designated by the same reference numerals and an explanation of them is omitted.

In the fourth embodiment, an angular velocity sensor 30L is referred to as a gyro 30L stable in lower frequency and an angular velocity sensor 30H is referred to as a gyro 30H good in higher frequency characteristics.

As shown in FIG. 9, angular velocity signals respectively outputted from the gyro 30L stable in lower frequency and the gyro 30H good in higher frequency characteristics have direct current components respectively removed by DC cut portions 32L and 32H, amplified by amplifying circuits 34L and 34H and inputted to a synthesizing circuit 36. The angular velocity signal obtained from the gyro 30L stable in lower frequency is designated by S1 and the angular velocity signal obtained from the gyro 30H good in higher frequency characteristics is designated by S2.

In the synthesizing circuit 36, a frequency region is divided into two frequency regions including a lower frequency region fL and a higher frequency region fH by taking a frequency (i.e., a switching frequency) as a boundary. With respect to the angular velocity signals S1 and S2 respectively obtained from the gyro 30L stable in lower frequency and the gyro 30H good in higher frequency characteristics, the synthesizing circuit 36 obtains the signal component of the lower frequency region fL from the angular velocity signal S1 of the gyro 30L and the signal component of the higher frequency region fH from the angular velocity signal S2 of the gyro 30H. The synthesize circuit 36 synthesizes an angular velocity signal S3 of an entire frequency region.

Figure 10:
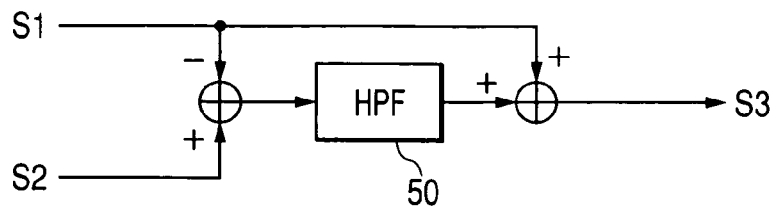
FIG. 10 is a block diagram showing one example of a synthesizing circuit in an angular velocity signal output portion.

In FIG. 10, one example of the synthesizing circuit 36 is shown. As shown in FIG. 10, when the angular velocity signal from the gyro 30L stable in lower frequency region and the angular velocity signal S2 from the gyro 30H good in higher frequency characteristics are inputted to the synthesizing circuit 36, a difference signal S2-S1 of them is inputted to a high-pass filter (HPF) 50. Thus, a signal of a frequency side lower than the cut-off frequency fc of the HPF 50 is cut off from the difference signal S2-S1. Only a signal of a frequency side higher than the cut-off frequency fc is outputted from the HPF 50. Then, the angular velocity signal S1 inputted from the gyro 30L stable in low frequency is added to the signal outputted from the HPF 50. An obtained signal is outputted as the angular velocity signal S3 from the synthesizing circuit 36.

Figure 11:
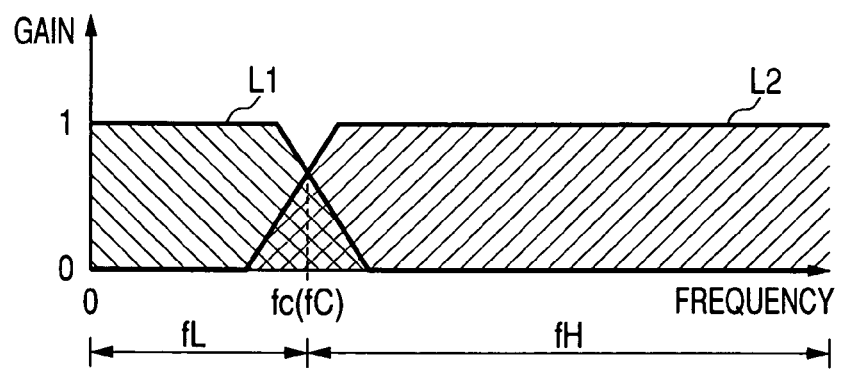
FIG. 11 shows the filter characteristic of the synthesizing circuit.

FIG. 11 shows the frequency characteristics of the synthesizing circuit 36. The characteristics of the synthesizing circuit 36 with respect to the angular velocity signal S1 inputted from the gyro 30L stable in lower frequency is represented by a graph L1. The characteristics of the synthesizing circuit 36 with respect to the angular velocity signal S2 from the gyro 30H good in higher frequency characteristics is represented by a graph L2. As shown by the characteristics, the signal of the lower frequency region fL lower than the cut-off frequency fc of the angular velocity signal S3 outputted from the synthesizing circuit 36, by taking the cut-off frequency fc of the HPF 50 as a boundary, is formed by the angular velocity signal S1 from the gyro 30L stable in lower frequency. The signal of the higher frequency region fH higher than the cut-off frequency fc is formed by the angular velocity signal S2 from the gyro 30H good in higher frequency characteristics. That is, the synthesizing circuit 36 is equivalent to a circuit that includes an LPF having the characteristics of the graph L1 to which the angular velocity signal S1 from the gyro 30L stable in lower frequency is inputted, the HPF having the characteristics of the graph L2 to which the angular velocity signal S2 from the gyro 30H good in higher frequency characteristics is inputted and an adder for adding the outputs of the LPF and the HPF.

The cut-off frequency fc of the HPF 50 is switched depending on whether or not the vibration of an optical system is present as described below. For instance, when it is decided that the vibration exists, the cut-off frequency is set to 4 Hz. The cut-off frequency fc of the HPF 50 is a frequency (a cross-over frequency) in which the graph L1 showing the characteristics of the LPF intersects the graph L2 showing the characteristics of the HPF. The cut-off frequency fc corresponds to a frequency at which when the angular velocity signal S3 is formed by the synthesizing circuit 36, the frequency region is divided into the lower frequency region and the higher frequency region, and a sensor for forming the angular velocity signal of the lower frequency region and a sensor for forming the angular velocity signal of the higher frequency region are switched from the gyro 30L stable in lower frequency to the gyro 30H good in higher frequency characteristics. This frequency is designated by fC, or referred to as the switching frequency fC of the synthesizing circuit 36 or the switching frequency fC of a synthesizing gyro for outputting an angular velocity signal obtained by combining the output of the gyro 30L stable in lower frequency with the output of the gyro 30H good in higher frequency characteristics (or simply referred to as a switching frequency fC).

As described above, since the signal component of the lower frequency region fL of a frequency side lower than the switching frequency fC is formed by the angular velocity signal S1 obtained from the gyro 30L stable in lower frequency and having the good drift characteristics, a variation of voltage due to a drift hardly occurs in the angular velocity signal S3 synthesized by the synthesizing circuit 36. Further, the angular velocity signal S1 obtained from the gyro 30L stable in lower frequency and having bad higher frequency characteristics is effectively used only in the lower frequency region fL. Accordingly, the frequency characteristics in the lower frequency region fL are improved. On the other hand, since the signal component of the higher frequency region fH of a frequency side higher than the switching frequency fC is formed by the angular velocity signal S2 obtained from the gyro 30H good in higher frequency characteristics and having good frequency characteristics, the frequency characteristics in the higher frequency region fH is good.

Accordingly, the angular velocity signal S3 synthesized by the synthesizing circuit 36 and outputted from an angular velocity signal output portion 10 to the LPF 12 as described above is equal to a signal obtained from an angular velocity sensor (a synthesizing gyro) having little drift and good frequency characteristics.

A case that the vibration is hardly generated in the optical system is compared with a case that the vibration is generated in the optical system. When the vibration is hardly generated in the optical system, it is more important to have little drift (good in drift characteristics) than to have good frequency characteristics. Assuming that the switching frequency fC of the synthesizing circuit 36 is determined so that both the drift characteristics and the frequency characteristics are good by considering a case that the vibration is generated to some degree on the optical system and the switching frequency is fixed to that value, when the vibration is hardly generated in the optical system, the variation of voltage due to a drift that is generated in the gyro 30H good in higher frequency characteristics may possibly appear in the angular velocity signal S3. Thus, a fluctuation of an image resulting therefrom may not be neglected.

Thus, in this embodiment, the switching frequency fC of the synthesizing circuit 36 is changed to obtain a more proper angular velocity signal S3 from the synthesizing circuit 36 in accordance with the magnitude or level of the vibration.

In FIG. 9, the angular velocity signal S1 obtained from the gyro 30L stable in lower frequency is allowed to be inputted to a low-pass filter (LPF) 38 before the angular velocity signal S1 is inputted to the synthesizing circuit 36. After a frequency component higher than a frequency range for which the image blur is corrected is cut off by the LPF 38, the angular velocity signal S1 is converted to a digital signal by an A/D converter 14 and inputted to a CPU 16. In such a way, the CPU 16 including a switching frequency changing portion 17 and an image vibration correcting portion 19 decides whether or not the vibration is generated in the optical system by the switching frequency changing portion 17 on the basis of a signal (a gyro signal stable in lower frequency) obtained only from the angular velocity signal S1 of the gyro 30L stable in lower frequency. For instance, when the value of the gyro 30L signal stable in lower frequency is smaller than a threshold value A, the CPU 16 decides that the vibration is not applied to the optical system. When the value of the gyro signal in lower frequency is not smaller than the threshold value A, the CPU 16 decides that the vibration is present. Then, the CPU outputs a switching signal for switching the value of the switching frequency fC on the basis of the decision.

As a signal used for deciding whether or not the vibration (the magnitude of the vibration) is applied to the optical system, the angular velocity signal S1 of the gyro 30L stable in lower frequency and having little drift is desired. However, the signal is not limited thereto and the angular velocity signal S3 synthesized by the synthesizing circuit 36 or the angular velocity signal S2 of the gyro 30H good in higher frequency characteristics may be used. Further, a signal obtained by integrating the angular velocity signal may be used to decide whether or not the vibration is generated.

Figure 12:
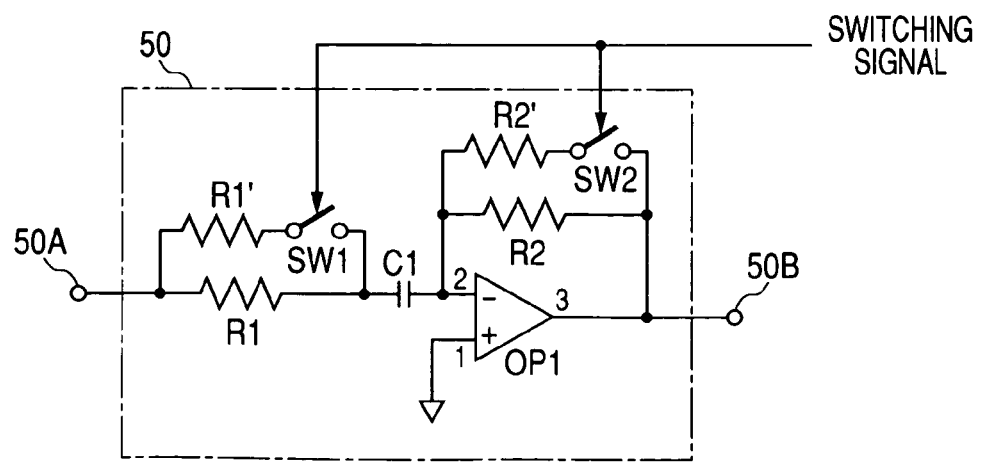
FIG. 12 is a block diagram showing one example of an HPF of the synthesizing circuit.

The switching operation of the switching frequency fC in the synthesizing circuit 36 is carried out by switching the cut-off frequency fc of the HPF 50 in the synthesizing circuit 36 shown in FIG. 10. FIG. 12 shows one example of a circuit structure of the HPF 50. As shown in FIG. 12, a non-inversion input terminal 1 of an operational amplifier OP1 is fixed to a constant potential (earth potential). An inversion input terminal 2 is connected to an input terminal 50A of the HPF 50 through a resistance R1 and a capacitor C1. On the other hand, an output terminal 3 of the operational amplifier OP1 is connected to an output terminal 50B of the HPF 50. A resistance R2 is connected between the output terminal 3 and the inversion input terminal 2 of the operational amplifier OP1. Thus, the high-pass filter of the cut-off frequency determined by the resistance values of the resistance R1 and the resistance R2 and the value of C1 is formed.

A resistance R' and a switch SW1 are connected in parallel with the resistance R1. A resistance R2' and a switch SW2 are connected in parallel with the resistance R2. Turning on/turning off of the switch SW1 and the switch SW2 are switched by a switching signal supplied form the CPU 16. The resistance values of the resistance R1 and the resistance R2 are changed when the switch SW1 and the switch SW2 are turned on and when the switches are turned off. Accordingly, the cur-off frequency fc of the HPF 50 is also changed. For instance, the cut-off frequency fc when the switch SW1 and the switch SW2 are turned off is switched to Fv which is preferable when it is decided that the vibration is generated in the optical system. The cut-off frequency fc when the switch SW1 and the switch SW2 are turned on is switched to Fs (>Fv) which is preferable when it is decided that the vibration is not generated in the optical system.

As described above, the cut-off frequency fc of the HPF 50 is switched so that the switching frequency fC (=fc) of the synthesizing circuit 36 can be switched. Further, under a state in which it is decided that the vibration is not present, the switching frequency fC can be switched to a value larger than that under a state in which it is decided that the vibration is present. Therefore, when the vibration is hardly generated in the optical system, the angular velocity signal S3 of the output of the synthesizing circuit 36 including a frequency component of a relatively higher frequency region is formed by the angular velocity signal S1 of the gyro 30L stable in lower frequency. A phenomenon that the image fluctuates due to a drift generated by the gyro 30H good in higher frequency characteristics is prevented.

Figure 13:
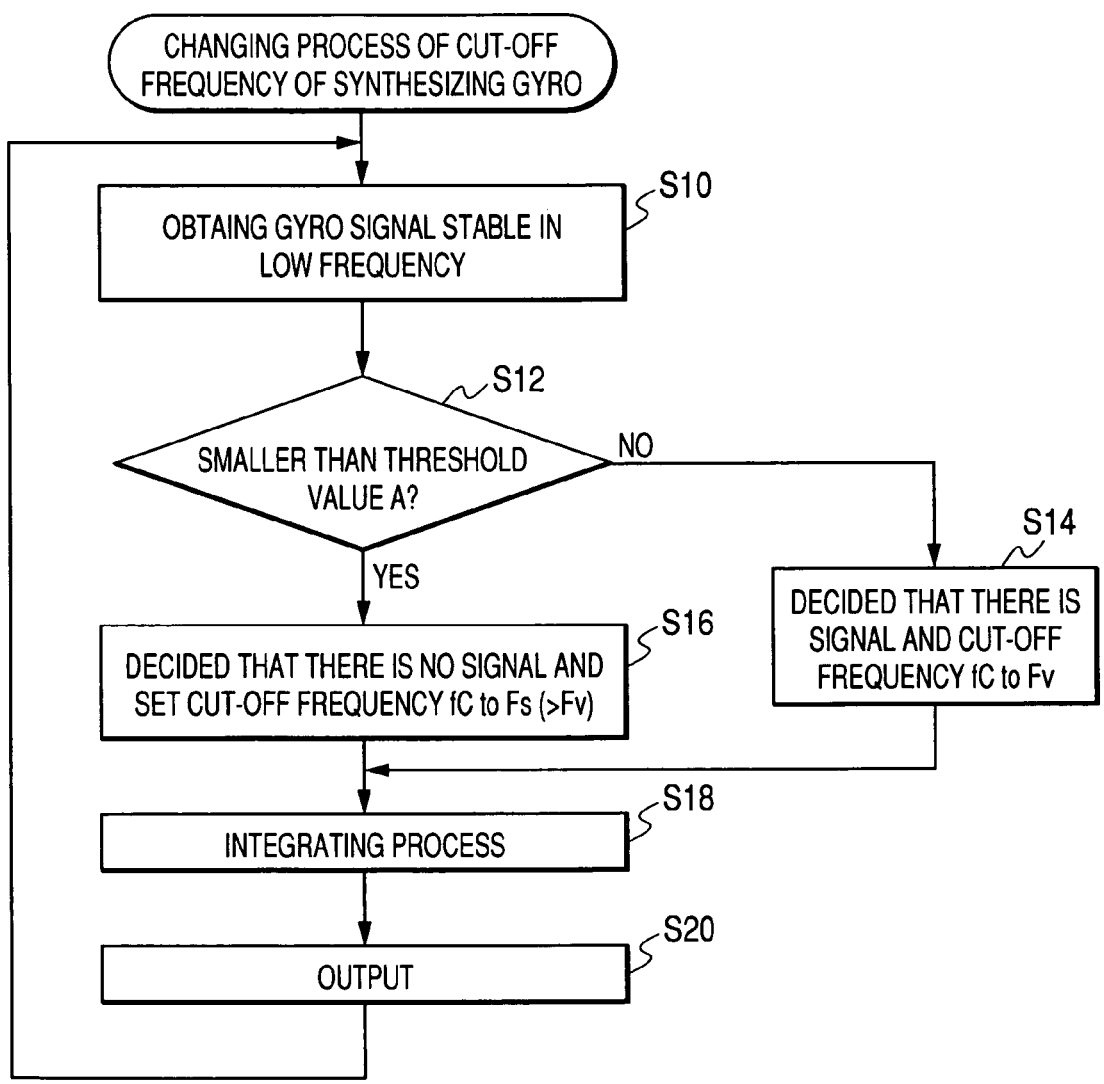
FIG. 13 is a flowchart showing a procedure for a switching process of a switching frequency in a CPU of the image blur correcting device.

FIG. 13 is a flowchart showing a procedure of a switching process of the switching frequency fC of the synthesizing circuit 36 (the synthesizing gyro) in the CPU 16. Firstly, the CPU 16 obtains the gyro signal stable in lower frequency got from the angular velocity signal S1 of the gyro 30L stable in lower frequency through the LPF 38 and the A/D converter 14 shown in FIG. 9 (step S10). Then, the CPU 16 decides whether or not the value of the gyro signal stable in lower frequency is smaller than a threshold value A (step S12).

When the CPU 16 decides NO, the CPU 16 decides that the vibration is present to turn off the switch SW1 and the switch SW2 of the HPF 50 by the switching signal outputted to the synthesizing circuit 36 (see FIG. 12) and set the switching frequency fC to the value Fv (step S14). On the other hand, in the step S12, when the CPU 16 decides YES, the CPU 16 decides that the vibration is not present to turn on the switch SW1 and the switch SW2 by the switching signal outputted to the synthesizing circuit 36 and set the switching frequency fC to the value Fs larger than Fv (step S16).

In such a way, when the CPU 16 sets the switching frequency fC of the synthesizing circuit 36, the CPU 16 performs an operation of an integrating process to the angular velocity signal S3 outputted by the synthesizing circuit 36 (an angular velocity signal output portion 10) having the switching frequency fC (step S18) and converts the angular velocity signal S3 to an angle signal. Then, the CPU 16 outputs the value of the angle signal to a D/A converter 18 (see FIG. 9) as a value showing the movement target position of an image blur correcting lens 24 (step S20). When the above-described processes are finished, the CPU 16 repeatedly performs the processes from the step S11. Thus, the switching frequency fC of the synthesizing circuit 36 is switched to preferable values depending on the states of the vibration of the optical system.

Subsequently, the process of the CPU 16 when other method is used as a method for deciding the presence or absence of the vibration of the optical system will be described by employing a flowchart shown in FIG. 14. Firstly, the CPU 16 obtains, for a time, the gyro signal stable in lower frequency got from the angular velocity signal S1 of the gyro 30L stable in lower frequency through the LPF 38 and the A/D converter 14 shown in FIG. 9 (step S30). Then, a difference D is obtained between the value of the gyro signal stable in lower frequency at each time when the gyro signal stable in lower frequency is obtained for the time and a reference value B (a value of the gyro signal stable in lower frequency upon having no vibration) (step S32) to obtain a sum total value ΣD thereof (step S34).

Subsequently, the CPU 16 decides whether or not the sum total value ΣD is smaller than a threshold value C (step S36). When the CPU 16 decides NO, the CPU 16 decides that the vibration is present to turn off the switch SW1 an the switch SW2 of the HPF 50 by the switching signal outputted to the synthesizing circuit 36 and set the switching frequency fC to the value Fv like the case shown in FIG. 13 (step S38). On the other hand, when the CPU 16 decides YES in the step S36, the CPU 16 decides that the vibration is not present to turn on the switches S1 and S2 of the HPF 50 by the switching signal outputted to the synthesizing circuit 36 and set the switching frequency fC to Fs lager then Fv (step S40). Following step S42 and step S44 are the same processes as those of the step S18 and the step S20 shown in FIG. 13 (an explanation thereof is omitted). When the process of the step S44 is finished, the CPU 16 returns to the step S30.

Figure 14:
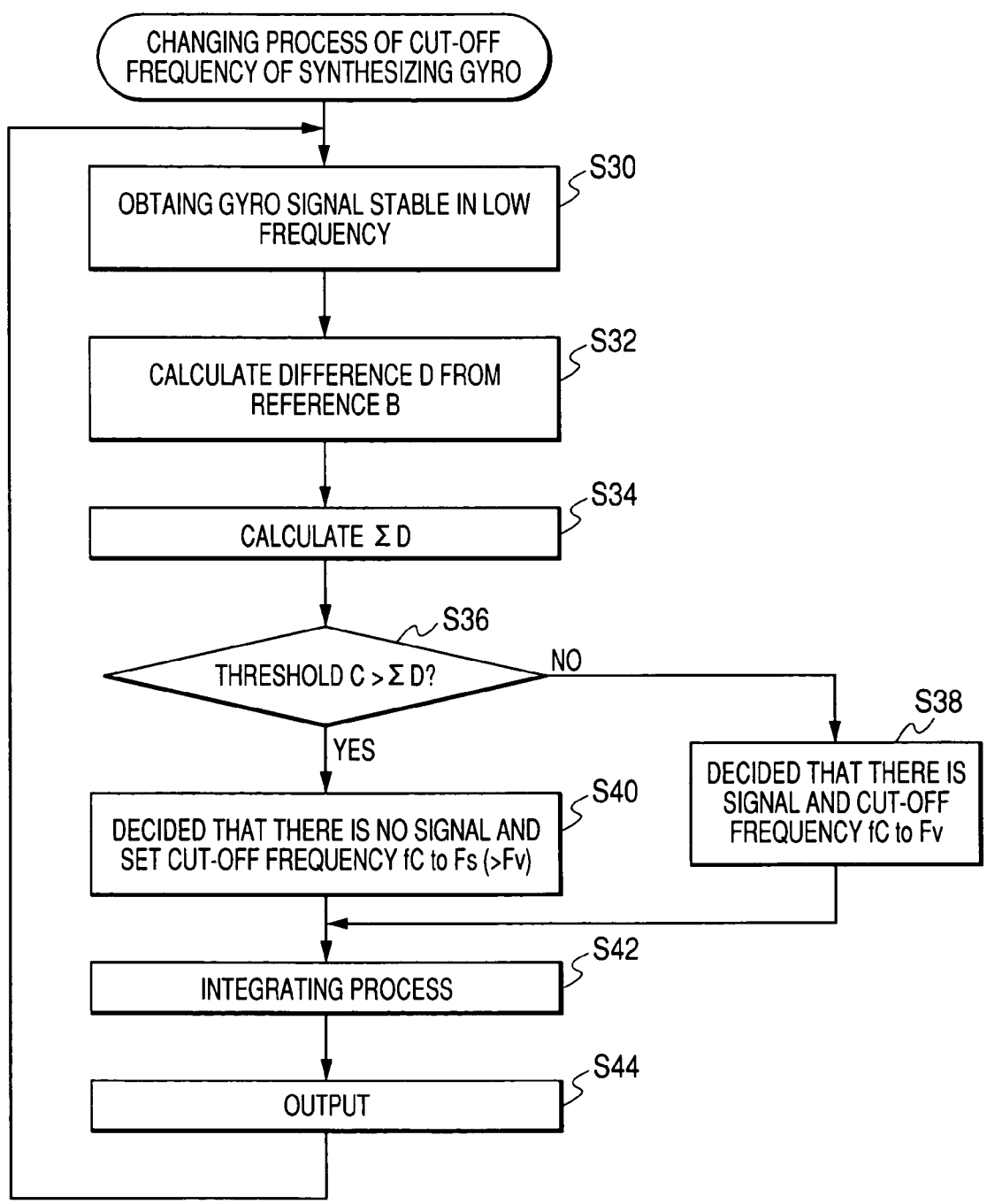
FIG. 14 is a flowchart showing another procedure for a switching process of a switching frequency in the CPU of the image blur correcting device.

As the method for deciding the presence or absence of the vibration of the optical system, a below-described method may be considered as well as the method for deciding the presence or absence of the vibration depending on whether or not the gyro signal stable in lower frequency is larger than the threshold as shown in FIG. 13 or the method for deciding the presence or absence of the vibration from the relation of the magnitude of the gyro signal stable in lower frequency and time as shown in FIG. 14. For instance, a signal (a gyro signal stable in lower frequency) obtained from the gyro 30L stable in lower frequency is compared with a signal obtained from the gyro 30H good in higher frequency characteristics in the same obtaining manner as the gyro 30L stable in lower frequency. Although the signal of the gyro 30L stable in lower frequency does not change, when the signal of the gyro 30H good in higher frequency characteristics changes, it may be decided that the vibration is not generated, and in other cases than the above, it may be decided that the vibration is generated.

FIFTH EMBODIMENT

A case will be described that the angular velocity signals S1 and S2 of the gyro 30L stable in lower frequency and the gyro 30H good in higher frequency characteristics are not combined by the synthesizing circuit 36 formed with an analog circuit as in the above-described embodiment, but synthesized so as to meet software. Even in this case, the switching frequency fC of the synthesizing gyro can be switched so as to meet software.

Figure 15:
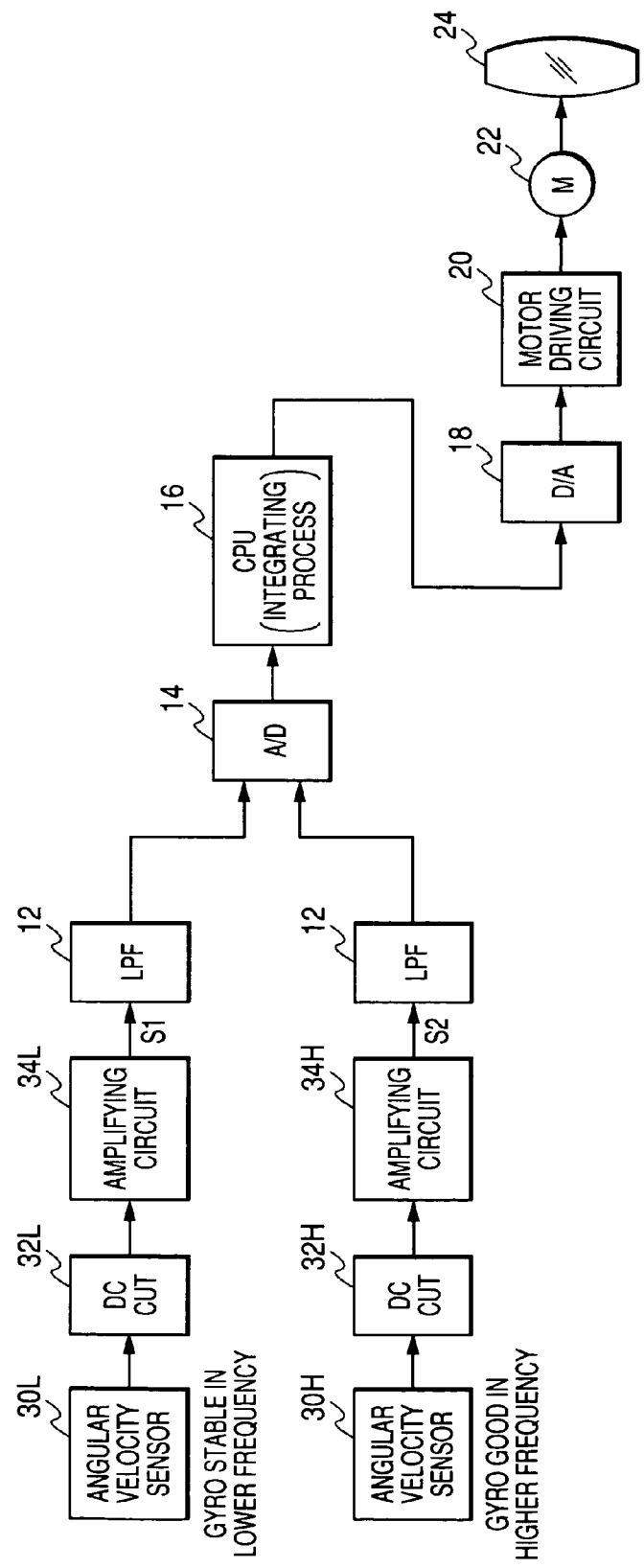
FIG. 15 is a block diagram showing another illustrative, non-limiting embodiment of an image blur-correcting device.

FIG. 15 is a block diagram showing another exemplary embodiment (a fifth embodiment) of an image blur correcting device in which the angular velocity signals S1 and S2 of a gyro 30L stable in lower frequency and a gyro 30H good in higher frequency characteristics are combined by using a software and a process is performed by a CPU 16 for carrying out an integrating process. Processing portions for performing the same processes as or similar processes to those shown in FIG. 9 are designated by the same reference numerals and an explanation thereof is omitted.

The angular velocity signal S1 outputted from an angular velocity sensor (the gyro stable in lower frequency) 30L and obtained through a DC cut portion 32L and an amplifying circuit 34L and the angular velocity signal S2 outputted from an angular velocity sensor (the gyro good in higher frequency characteristics) 30H and obtained through a DC cut portion 32H and an amplifying circuit 34H are not inputted to a synthesizing circuit 36 as shown in FIG. 9 and respectively fetched to the CPU 16 through LPFs 12 and an A/D converter 14. Thus, the CPU 16 directly obtains the angular velocity signal from the gyro 30L stable in lower frequency and the angular velocity signal from the gyro 30H good in higher frequency characteristics.

The CPU 16 synthesizes the angular velocity signal from the gyro 30L stable in lower frequency with the angular velocity signal from the gyro 30H good in higher frequency characteristics by a computing process of a digital filter to form an angular velocity signal like the output of the above-described synthesizing circuit 36. Further, the CPU 16 performs the integrating process to the angular velocity signal synthesized by the computing process to calculate an angle signal.

Further, the CPU 16 decides whether or not a vibration is generated on an optical system on the basis of the angular velocity signal obtained from the gyro 30L stable in lower frequency in the same manner as the process described by referring to FIG. 13 or 14. Then, in accordance with the decision, the CPU 16 changes a multiplier in the computing process of the digital filter for synthesizing the angular velocity signal from the gyro 30L stable in lower frequency and the angular velocity signal from the gyro 30H good in higher frequency characteristics. Thus, a switching frequency fC is switched in accordance with the presence or absence of the vibration in the same manner as that of the above-described embodiment.

In the above-described embodiments, the switching frequency fc of the synthesizing circuit 36 (the synthesizing gyro) is switched to the two values of Fs and Fv. The present invention is not limited thereto, and the switching frequency may be switched to values more than two in accordance with the state of the vibration such as the magnitude of the vibration. When the switching frequency fC is switched from Fs to Fv or from Fv to Fs, the switching frequency may gradually (stepwise or continuously) shift from one value to the other value. Further, the value Fs or Fv to which the switching frequency fC is switched may be set to a value desired by a user.

Further, in the above-described embodiment, the switching frequency fc is automatically switched. However, the switching frequency may be manually switched. Further, the switching frequency may be set to an arbitrary value without limiting to a specific value.

SIXTH EMBODIMENT

Figure 16:
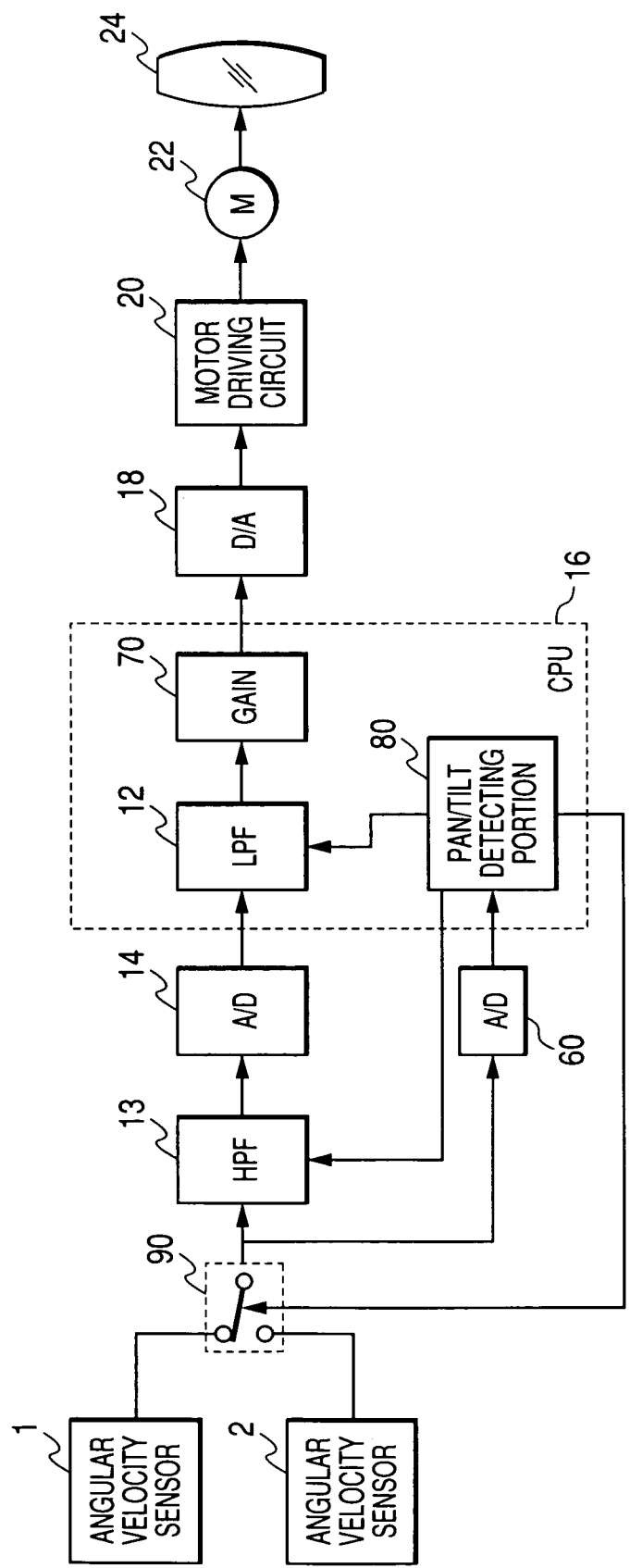
FIG. 16 is a block diagram showing the inner structure of an image blur correcting device according to an illustrative, non-limiting embodiment of the present invention.

FIG. 16 is a block diagram showing the inner structure of an image blur correcting device according to another exemplary embodiment of the present invention. The image blur correcting device is mounted on, for instance, a lens device (a shooting or photographing lens) for a television camera, a movie camera or a still camera or the like. An image blur correcting lens 24 shown in FIG. 16 is disposed so as to be movable upward and downward (a vertical direction) and rightward and leftward (a horizontal direction) in a plane perpendicular to an optical axis in an optical system such as the lens device or the camera on which the image blur correcting device is mounted. The image blur correcting lens 24 is driven in the vertical direction or the horizontal direction by a motor 22. When a vibration is generated in the camera (the optical system), the image blur correcting lens is moved to a position for correcting the vibration of an image (a position for canceling the image blur due to the vibration) by the motor 22. Since the image blur correcting lens 24 is driven in the same manner in any of the vertical direction and the horizontal direction on the basis of the vibration generated in each of the directions, only the structure for correcting the image blur with respect to one direction (for instance, the horizontal direction) is shown in FIG. 16. Thus, it is assumed that a structure for correcting the vibration of an image relative to the other direction has the same structure as described above.

Two angular velocity sensors 1 and 2 shown in FIG. 16 are, for instance, gyro sensors and disposed on upper surfaces of lens barrels to detect the vibration of an optical system. From the angular velocity sensors 1 and 2 respectively, electric signals of voltage corresponding to the angular velocity of the vibration generated, for instance, rightward and leftward of the lens barrels are outputted as angular velocity signals.

As the two angular velocity sensors 1 and 2, sensors having different characteristics are employed. When the characteristics of the angular velocity sensor 1 are compared with those of the angular velocity sensor 2 in the frequency region (for instance, about 1 to 30 Hz) of the vibration ordinarily considered to be an object for which the image blur is corrected, the angular velocity sensor 1 is a sensor having large noise in a lower frequency (having more drift) and having good frequency characteristics (having a small phase lag in a higher frequency region). The angular velocity sensor 2 is a sensor inferior in frequency characteristics (having a large phase lag in a higher frequency region) and having small noise in a lower frequency (having less drift) due to a drift. The angular velocity sensor 1 may be said to be an angular velocity sensor excellent in characteristics (output characteristics) of an output signal with respect to the vibration of the higher frequency region. The angular velocity sensor 2 may be said to be an angular velocity sensor excellent in output characteristics with respect to the vibration of a lower frequency region.

The angular velocity signals respectively outputted from the angular velocity sensors 1 and 2 are inputted to a switch circuit (a sensor switching portion) 90. As described below, one of the angular velocity signals is outputted to a high-pass filter (HPF) 13 from the switch circuit 90.

The HPF 13 cuts off a signal component of a frequency side lower than a cut-off frequency from the signal component of the angular velocity signal inputted through the switch circuit 90 and extracts a signal component of a frequency side higher than the cur-off frequency. Thus, a direct current component or the like included in the angular velocity signal is removed. The angular velocity signal extracted by the HPF 13 is subsequently converted to a digital signal by an A/D converter 14, and then, inputted to a CPU 16.

The CPU 16 has various kinds of processing functions. When the processing functions of the CPU 16 are represented by functional blocks, the CPU 16 is divided into a low-pass filter 12, a gain circuit 70 and a pan/tilt-detecting portion (a mode switching portion) 80 as shown by a block of the CPU 16 in FIG. 16.

The angular velocity signal inputted to the CPU 16 from the A/D converter 14 is integrated by the low-pass filter (LPF) 12 of the cut-off frequency and converted to an angle signal. Then, the gain circuit 70 adjusts a gain. Thus, a quantity of displacement (a quantity of displacement from a reference position) of the image blur correcting lens 24 for displacing the image with a direction and magnitude for canceling the image blur generated by the vibration of the optical system is obtained as the angle signal. The value of the angle signal obtained by the gain circuit 70 is outputted from the CPU 16 as a value showing the movement target position of the image blur correcting lens 24.

The angle signal outputted from the CPU 16 is converted to an analog signal by a D/A converter 18, and then, inputted to a motor driving circuit 20. The motor driving circuit 20 drives a motor 22 for moving the image blur correcting lens 24, for instance, rightward and leftward to move the image blur correcting lens 24 to a position corresponding to the value of the angle signal outputted from the CPU 16. Thus, the image blur due to the vibration applied to the optical system is corrected.

On the other hand, the angular velocity signal that is outputted from the angular velocity sensor 1 or the angular velocity sensor 2, selected by the switch circuit 90 and outputted to the HPF 13 is allowed to branch before the angular velocity signal is inputted to the HPF 13 and inputted to an A/D converter 60. The angular velocity signal inputted to the A/D converter 60 is converted to a digital signal from an analog signal and inputted to the CPU 16.

The angular velocity signal inputted to the CPU 16 from the A/D converter 60 is got by the pan/tilt detecting portion 80 shown as the functional block of the CPU 16. The pan/tilt-detecting portion 80 decides whether or not a pan/tilt operation is carried out (started) on the basis of the obtained angular velocity signal. For instance, assuming that the value of the angular velocity signal obtained when the optical system is in a static state is zero, it is decided that the pan/tilt operation is carried out when the value (X) of the angular velocity signal continuously shows a value (X>As or X<−As) exceeding a threshold value (As (>0) and −As) in either a positive direction or a negative direction for a time or more. On the other hand, after it is decided that the pan/tilt operation is carried out, for instance, when the value (X) of the angular velocity signal continuously shows a value (X<Bs or X>−Bs) that does not exceed a threshold value (Bs (>0) and −Bs) for a time or more, it is decided that the pan/tilt operation is finished. A method for starting or finishing the pan/tilt operation is not limited thereto.

Further, the pan/tilt detecting portion 80 (CPU 16) performs a control concerning the switching of a connection of the switch circuit 90 or the change of the characteristics of the HPF 13 and the LPF 12. When the pan/tilt operation is not carried out and when the pan/tilt operation is carried out, an effectively used angular velocity sensor of the angular velocity sensors 1 and 2 is switched. Further, the characteristics of the HPF 13 and the LPF 12 are changed to control the image blur correcting lens 24 by a proper operation in accordance with a shooting state (or a photographing state).

Namely, whether or not the pan/tilt operation is carried out can be recognized by the process for deciding the start and the completion of the pan/tilt operation. As a result, when it is decided that the pan/tilt operation is not carried out, the cut-off frequency of the HPF 13 and the LPF 12 is lowered more than that when it is decided that the pan/tilt operation is carried out. Thus, the characteristics of the HPF 13 and the LPF 12 are set so as to have image blur correcting characteristics (image blur correcting characteristics in a fixing shooting composition mode) in which an importance is attached to the correction of the image blur with respect to the vibration of the lower frequency region applied to the optical system. Further, in this case, the switch circuit 90 is connected to the angular velocity sensor 2 side to select the angular velocity sensor 2 excellent in output characteristics with respect to the vibration of the lower frequency region of the frequency region (generally, about 1 Hz to 30 Hz) of the vibration. Thus, the angular velocity signal from the angular velocity sensor 2 is supplied to the HPF 13 or the A/D converter 60. Accordingly, when a shooting operation is desired to be carried out by fixing the shooting composition without performing the pan/tilt operation, the fluctuation of the image generated due to the noise of a lower frequency outputted from the angular velocity sensor that is to be most removed is reduced and the image blur is properly corrected with respect to the vibration of the frequency region overlapped on the noise of the lower frequency. Further, the image blur is corrected in the level of a performance corresponding to the frequency characteristics of the angular velocity sensor 2 with respect to the vibration of the higher frequency region.

On the other hand, when it is decided that the pan/tilt operation is carried out, the cut-off frequency of the HPF 13 and the LPF 12 is increased more than that when it is decided that the pan/tilt operation is not carried out. Thus, the angular velocity signal of the lower frequency region resulting from the pan/tilt operation is removed from an object for which the image blur is corrected. Further, the characteristics of the HPF 13 and the LPF 12 are set so as to have image blur correcting characteristics (image blur correcting characteristics in a changing shooting composition mode) in which an importance is attached to the correction of the image blur with respect to the vibration of the higher frequency region applied to the optical system. Further, in this case, the switch circuit 50 is connected to the angular velocity sensor 1 side to select the angular velocity sensor 1 excellent in output characteristics with respect to the vibration of the higher frequency region of the frequency region of the vibration. Thus, the angular velocity signal from the angular velocity sensor 1 is supplied to the HPF 13 or the A/D converter 60. Accordingly, when the pan/tilt operation of the camera is carried out, the image blur with respect to the angular velocity signal resulting from the pan/tilt operation is not corrected to select the angular velocity sensor 1 having a good follow-ability of angle of view with respect to the pan/tilt operation and good frequency characteristics (phase characteristics) with respect to the vibration of the higher frequency to be removed, so that the image blur is properly corrected. Further, the angular velocity sensor 1 is selected so that the noise of the lower frequency included in the angular velocity signal is large. However, since the noise of the lower frequency is removed by the HPF, its influence hardly arises.

Figure 17:
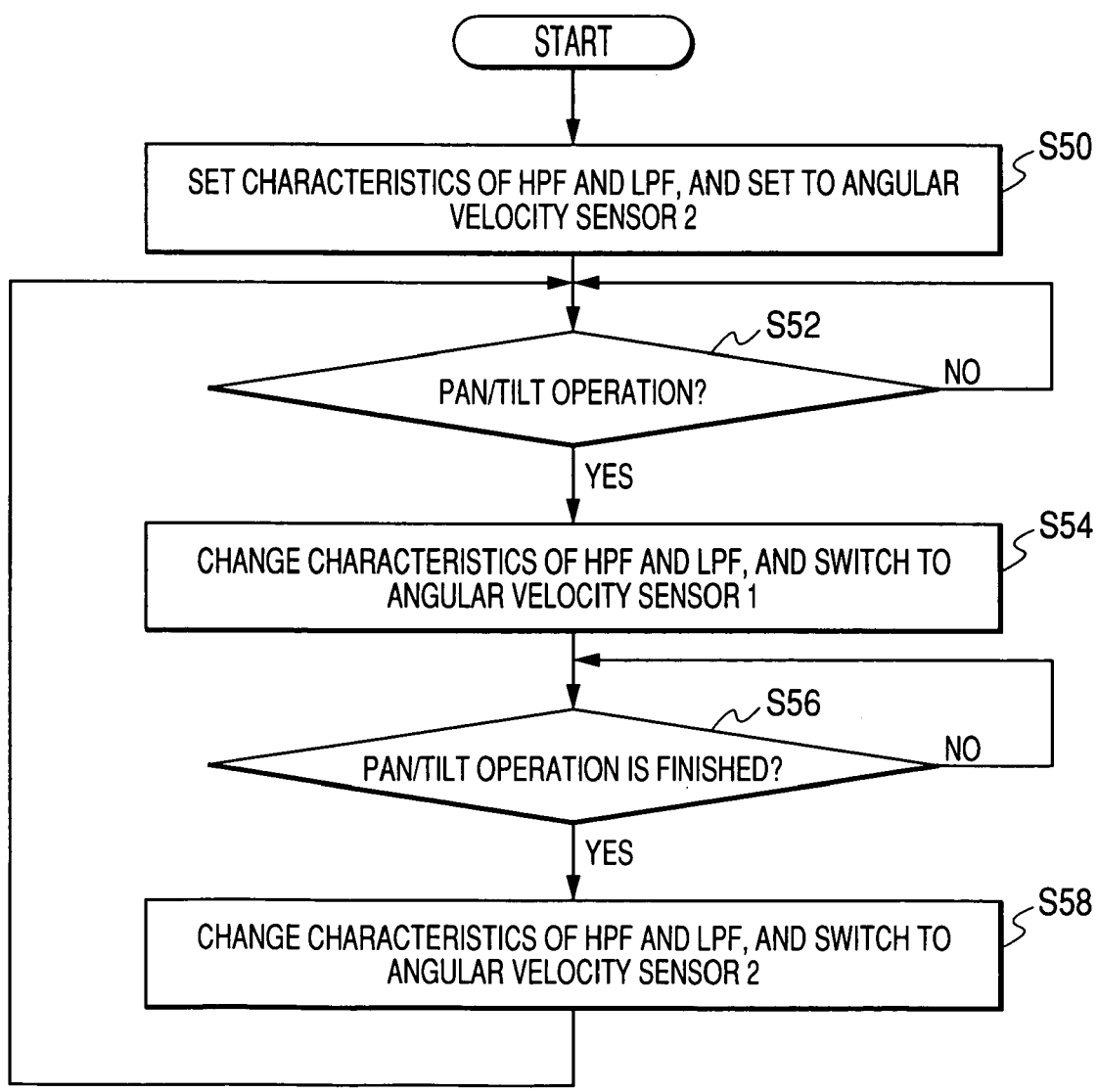
FIG. 17 is a flowchart showing a procedure for switching an angular velocity sensor in a pan/tilt detecting portion (CPU).

FIG. 17 is a flowchart showing a procedure for switching the angular velocity sensor in the above-described pan/tilt detecting portion 80 (CPU 16). When a process for correcting the image blur is started, the pan/tilt detecting portion 80 firstly sets the characteristics of the HPF 13 and the LPF 12 so as to have the image blur correcting characteristics (the image blur correcting characteristics in the fixing shooting composition mode) in which an importance is attached to the correction of the image blur with respect to the vibration of the lower frequency region in the frequency region of the vibration. Further, the switch circuit 90 is connected to the angular velocity sensor 2 side to select the angular velocity sensor 2 excellent in output characteristics in the lower frequency region as an effective angular velocity sensor (step S50).

Subsequently, the pan/tilt detecting portion 80 decides whether or not the pan/tilt operation is carried out (started) on the basis of the angular velocity signal inputted from the A/D converter 60 (step S52). When the pan/tilt detecting portion 80 decides NO, the pan/tilt detecting portion 80 maintains the connection of the switch circuit 90 and the characteristics of the HPF 13 and the LPF 12 without changing them to repeat the deciding process in the step S52.

In the step S52, when the pan/tilt detecting portion 80 decides YES, the pan/tilt detecting portion 80 sets the characteristics of the HPF 13 and the LPF 12 so as to have the image blur correcting characteristics (the image blur correcting characteristics in the changing shooting composition mode) in which an importance is attached to the follow-ability of the angle of view with respect to the pan/tilt operation and the correction of the image blur with respect to the vibration of the higher frequency. Further, in this case, the connection of the switch circuit 90 is changed to the angular velocity sensor 1 side to switch the effective angular velocity sensor to the angular velocity sensor 1 excellent in output characteristics in the higher frequency region (step S54).

Then, the pan/tilt detecting portion 80 decides whether or not the pan/tilt operation is finished on the basis of the angular velocity signal inputted from the A/D converter 60 (step S56). While the pan/tilt detecting portion 80 decides NO, that is, while the pan/tilt operation is carried out, the pan/tilt detecting portion 80 maintains the connection of the switch circuit 90 and the characteristics of the HPF 13 and the LPF 12 without changing them.

On the other hand, in the step S56, when the pan/tilt detecting portion 80 decides YES, the pan/tilt detecting portion changes the characteristics of the HPF 13 and the LPF 12 so as to have the image blur correcting characteristics in which an importance is attached to the correction of the image blur with respect to the vibration of the lower frequency region. Further, the connection of the switch circuit 90 is changed to the angular velocity sensor 2 side to change the effective angular velocity sensor to the angular velocity sensor 2 excellent in characteristics in the lower frequency region (step S58). Then, the pan/tilt operation-detecting portion returns to the process of the step S52 and repeats the processes of the step S52 to the step S58.

SEVENTH EMBODIMENT

Figure 18:
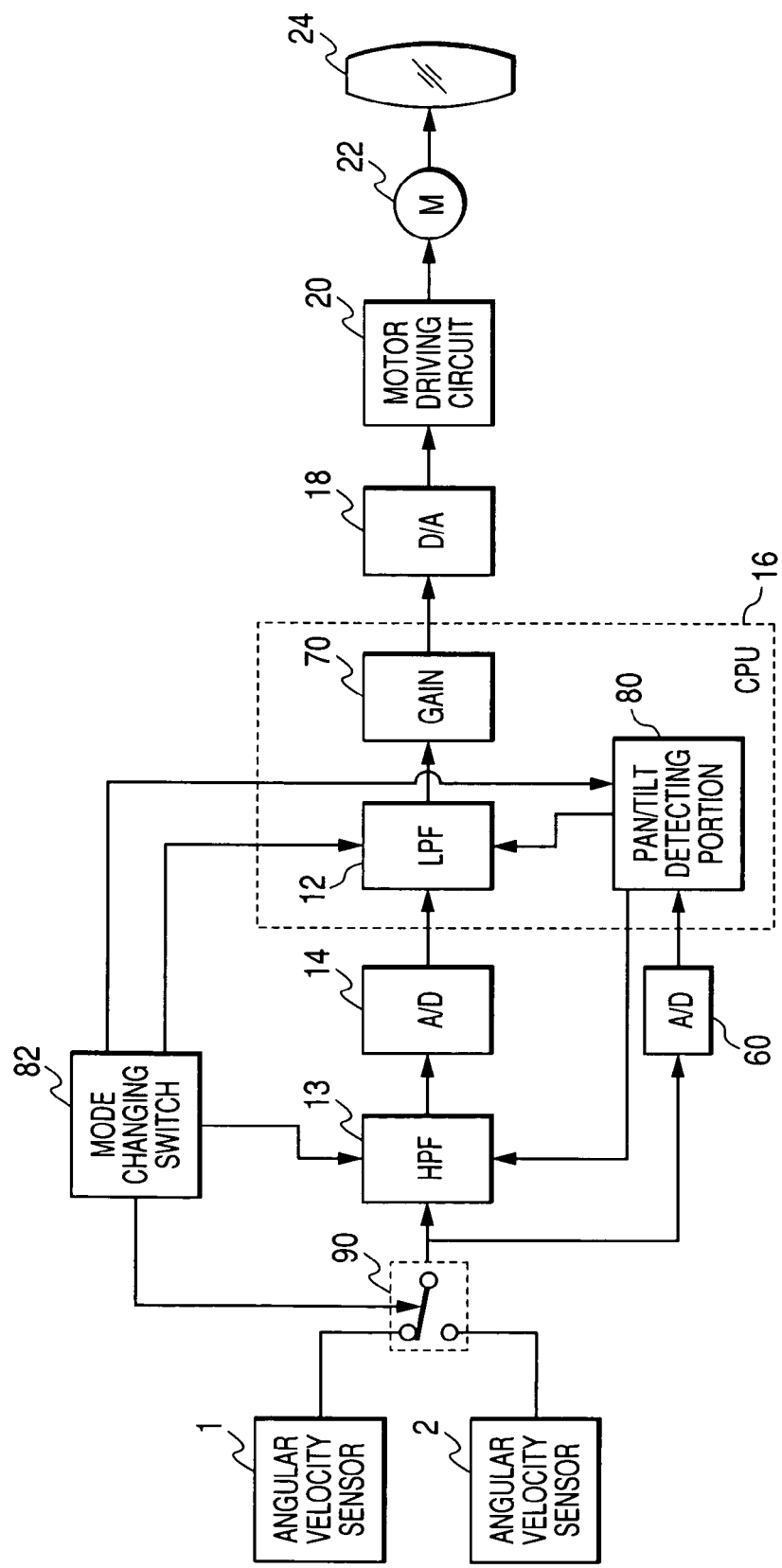
FIG. 18 is a block diagram showing the inner structure of other embodiment of an image blur correcting device according to an illustrative, non-limiting embodiment of the present invention.

Another exemplary embodiment of the image blur correcting device according to the present invention will be described below. In the above-described embodiment, the pan/tilt detecting portion 80 automatically switches the connection of the switch circuit 90 (switches the angular velocity sensor that is made effective) or changes the characteristics of the HPF 13 and the LPF 12 depending on whether the pan/tilt operation is carried out or not to change the image blur correcting characteristics. However, the present invention is not limited thereto. A user may manually switch the image blur correcting characteristics depending on a shooting state that a shooting operation is carried out by fixing a shooting composition without performing the pan/tilt operation or a shooting operation is carried out by changing the shooting composition by the pan/tilt operation. FIG. 18 shows an inner structure of the image blur correcting device (a seventh embodiment) in that case. Component blocks the same as or similar to those in FIG. 16 are designated by the same reference numerals as those of FIG. 16 and an explanation thereof is omitted. As compared with FIG. 16, a mode-changing switch 82 is added in the image blur correcting device shown in FIG. 18. In the mode-changing switch 82, for instance, a switch member such as a slide switch for selecting a mode is disposed. When the user manually operates the switch member to select (change) the mode, the connection of a switch circuit 90 or the characteristics of an HPF 13 and an LPF 12 are changed in accordance with the selected mode. The mode that can be selected by the mode changing switch 82 includes the mode (a high mode) upon fixing the shooting composition effective when the shooting operation is carried out by fixing a shooting composition and the mode (a standard mode) upon changing the shooting composition effective when the shooting operation is carried out by continuously or intermittently performing the pan/tilt operation without fixing the composition.

In the above embodiment, when the fixing shooting composition mode is selected, the mode changing switch 82 changes the characteristics of the HPF 13 and the LPF 12 so as to have the image blur correcting characteristics in which an importance is attached to the correction of the image blur with respect to the vibration of the lower frequency region like the case that the pan/tilt operation is not carried out. Further, the connection of the switch circuit 90 is set to the angular velocity sensor 2 side to set the effective angular velocity sensor to the angular velocity sensor 2 excellent in output characteristics in the lower frequency region.

On the other hand, in the above embodiment, when the changing shooting composition mode is selected, the mode changing switch 82 changes the characteristics of the HPF 13 and the LPF 12 so as to have the image blur correcting characteristics in which an importance is attached to the follow-ability of angle of view with respect to the pan/tilt operation and the correction of the image blur with respect to the vibration of the higher frequency region like the case that the pan/tilt operation is carried out. Further, the mode changing switch 82 changes the connection of the switch circuit 90 to the angular velocity sensor 1 side and sets the effective angular velocity sensor to the angular velocity sensor 1 excellent in output characteristics in the higher frequency region. In the embodiment shown in FIG. 16, when the pan/tilt operation is carried out, the image blur correcting characteristics are switched to the image blur correcting characteristics corresponding to the changing shooting composition mode in this embodiment. However, when the image blur correcting characteristics are manually switched as in this embodiment, the mode can be set to the changing shooting composition mode before the pan/tilt operation of the camera is performed. Therefore, in the embodiment shown in FIG. 16, an uneasy feeling such as what is called a "re-fluctuation" occurs upon starting the pan/tilt operation by the operation of an image blur correcting lens 24 until the pan/tilt operation is detected by the pan/tilt detecting portion 80 to switch the image blur correcting characteristics after the pan/tilt operation is actually started. On the other hand, in this embodiment, the image blur correcting characteristics are set to image blur correcting characteristics effective upon pan/tilt operation before the pan/tilt operation is started. Thus, such an uneasy feeling does not advantageously occur.

In FIG. 18, a pan/tilt detecting portion 80 is provided like FIG. 16. However, when the connection of the switch circuit 90 or the characteristics of the HPF 13 and the LPF 12 are changed in accordance with only the mode selected by the mode-changing switch 82, the pan/tilt detecting switch 80 is not necessary. As compared therewith, when the pan/tilt detecting portion 80 is provided as shown in FIG. 18 to detect whether or not the pan/tilt operation is carried out, if the pan/tilt operation is not performed, the connection of the switch circuit 90 or the characteristics of the HPF 13 and the LPF 12 are changed by the mode changing switch 82 as described above. When the pan/tilt operation is carried out, the correction of the vibration of an image can be stopped.

Figure 19:
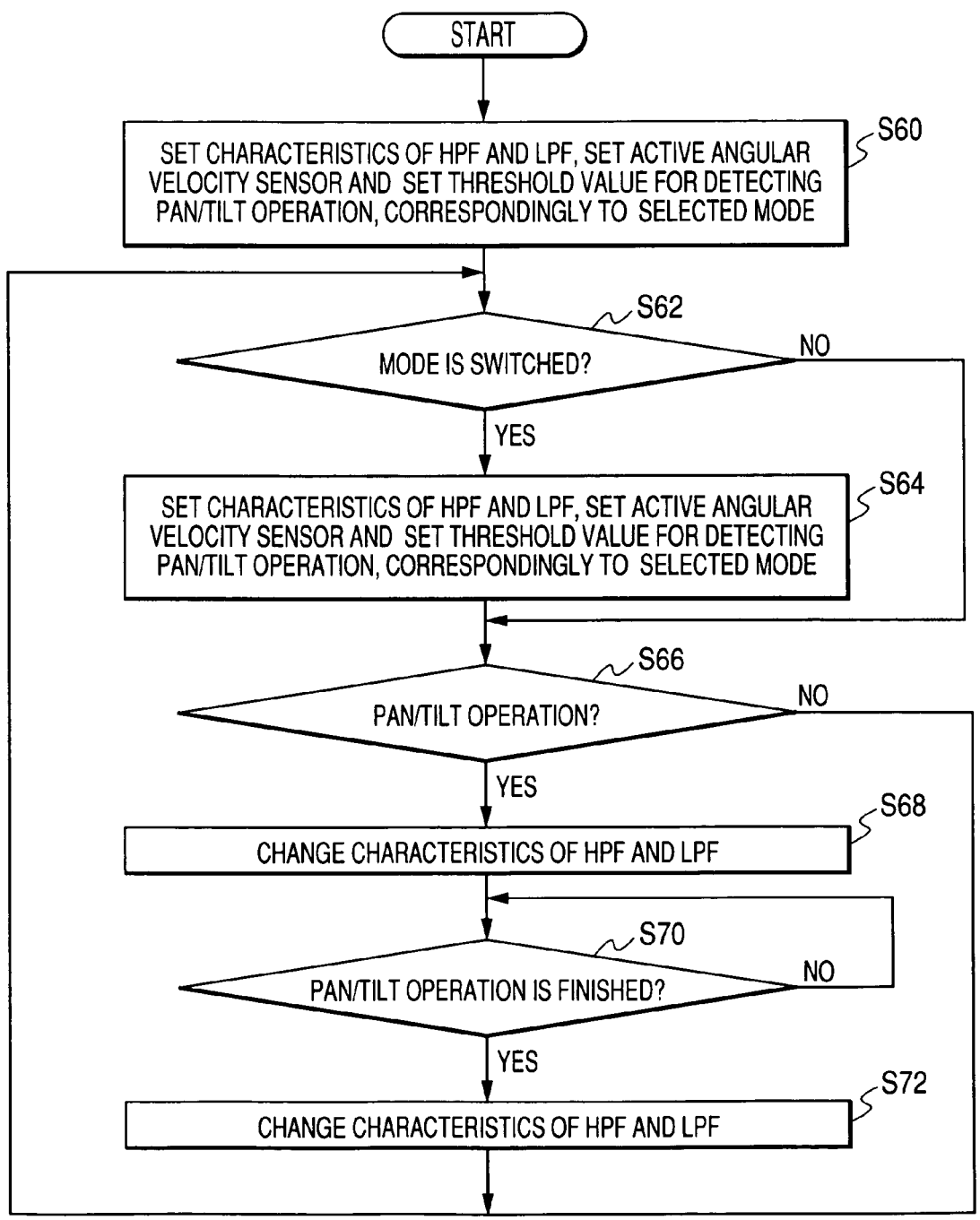
FIG. 19 is a flowchart showing a procedure for switching an angular velocity sensor and changing image blur correcting characteristics in a mode changing switch and a pan/tilt detecting portion (CPU) in another illustrative, non-limiting embodiment.

FIG. 19 is a flowchart showing a procedure in the mode-changing switch 82 and the pan/tilt detecting portion 80 (CPU 16) when the correction of the image blur is stopped upon performing the pan/tilt operation. When an image vibration correcting process is started, below-described processes are firstly carried out in an initialization in step S60. The mode changing switch 82 sets the characteristics of the HPF 13 and the LPF 12 to characteristics corresponding to a currently selected mode (the changing shooting composition mode or the fixing shooting composition mode) and connects the switch circuit 90 to an angular velocity sensor side corresponding to the mode. In the changing shooting composition mode, an angular velocity sensor 1 is selected. In the fixing shooting composition mode, an angular velocity sensor 2 is selected. The switch member in the mode-changing switch 82 may be, for instance, an automatically return type push button switch. Thus, every time the switch member is turned on, the changing shooting composition mode and the fixing shooting composition mode may be successively switched like a toggle type. In that case, the mode is set to either the changing shooting composition mode or the fixing shooting composition mode that is previously determined as a first mode.

Further, when an angular velocity signal obtained from an A/D converter 60 continuously shows a value exceeding a threshold value in a positive or negative direction for a time to decide that the panning and tilting operation is carried out, the pan/tilt detecting portion 80 changes the threshold value to a value corresponding to the mode. For instance, in the changing shooting composition mode having a high possibility of performing the pan/tilt operation, the threshold value is set to a lower value. In the fixing shooting composition mode having a low possibility of performing the pan/tilt operation, the threshold value is set to a higher value.

Subsequently, the mode-changing switch 82 decides whether or not the mode is switched to instruct the currently selected mode to be switched to a different mode (step S62). When the mode changing switch 82 decides YES, the mode changing switch 82 changes the characteristics of the HPF 13 and the LPF 12 to characteristics corresponding to a newly selected mode and switches the connection of the switch circuit 90 to switch the effective angular velocity sensor to an angular velocity sensor corresponding to the newly selected mode. Further, the pan/tilt-detecting portion 80 changes the threshold value for detecting the pan/tilt operation to a value corresponding to the newly selected mode (step S64).

On the other hand, in the step 62, the mode-changing switch 82 decides NO, the mode-changing switch 82 does not carry out a process and maintains the characteristics of the HPF 13 and the LPF 12 and the connection of the switch circuit 50.

Then, the pan/tilt detecting portion 80 decides whether or not the pan/tilt operation is carried out on the basis of the angular velocity signal obtained from the A/D converter 60 (step S66). When the pan/tilt detecting portion 80 decides NO, the procedure returns to the step S62 without performing below-described processes from step S68 to step S70 during the pan/tilt operation.

On the other hand, in the step S66, when the pan/tilt detecting portion 80 decides YES, the pan/tilt detecting portion 80 changes the characteristics of the HPF 13 and the LPF 12 to characteristics when the correction of the image blur is stopped and returns and stops the image blur correcting lens 24 to a referenced position (step S68). For instance, the characteristics of the HPF 13 and the LPF 12 are changed to characteristics that the cut-off frequency of the HPF 13 and the LPF 12 is set to be higher than a cut-off frequency in the fixing shooting composition mode to return the image blur correcting lens 24 to the reference position.

Then, the pan/tilt-detecting portion 80 decides whether or not the pan/tilt operation is finished (step S70). While the pan/tilt detecting portion 80 decides No, the pan/tilt detecting portion repeats the deciding process. In the step S70, when the pan/tilt detecting portion decides YES, the pan/tilt detecting portion returns the characteristics of the HPF 13 and the LPF 12 to the characteristics before they are changed in the step S68 (step S72) to return to the step S62.

While the pan/tilt operation is performed, when the shooting operation is carried out in accordance with the above-described processes, if the changing shooting composition mode is selected, the "re-fluctuation" upon starting the pan/tilt operation does not occur and the correction of the image blur can be stopped to improve the follow-ability of angle of view. Further, when the shooting operation is carried out by fixing a shooting composition, if the fixing shooting composition mode is selected, the fluctuation of the image resulting from the drift of an angular sensor does not occur and the image blur can be properly corrected to fix the shooting composition.

In the embodiments shown in FIGS. 16 and 18, the image blur due to the vibration is cancelled by an image-displacing unit for intentionally displacing the image of the optical system by displacing the image blur correcting lens 24. However, as systems for canceling the image blur, not only the system described in the above-described embodiments, but also various systems exist. The various systems include a system in which the image blur due to the vibration is cancelled by an image displacing unit for displacing an imaging element of a camera to intentionally displace the image or a system in which the image blur is not corrected by an optical image displacing unit and the image blur due to the vibration is cancelled by an electronic image displacing unit for displacing a range cut off as a recording or reproducing image signal from the range of a photographed image that is taken by the imaging element of a camera to intentionally displace the image. The present invention may be applied the above-described systems.

In the above-described embodiments, the image blur correcting characteristics are changed by changing the cut-off frequency of the HPF 13 or the LPF 12. However, the image blur correcting characteristics may be changed any of methods and means. Particularly, the HPF 13 is not necessarily required.

In the above-described embodiments, the example is described that the vibration applied to the optical system is detected by the angular velocity sensor to correct the image blur in accordance with the angular velocity signal outputted from the angular velocity sensor. However, the present invention may be applied to a case that the vibration applied to the optical system is detected by a vibration detecting sensor except the angular velocity sensor, for instance, an angular acceleration sensor, an acceleration sensor, a velocity sensor, an angular displacement sensor or a displacement sensor to correct the image blur in accordance with a vibration signal outputted from the vibration detecting sensor correspondingly to the vibration.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

The entire disclosure of each and every foreign patent application from which the benefit of foreign priority has been claimed in the present application is incorporated herein by reference, as if fully set forth herein.

What is claimed is:

1. An image blur correcting device comprising:
   an optical system that forms an image;
   a vibration signal output unit that outputs a vibration signal corresponding to a vibration applied to the optical system;
   an image displacing unit that displaces the image; and
   an image blur correcting unit that controls the image-displacing unit based on the vibration signal outputted from the vibration signal output unit so that the image-displacing unit displaces the image so as to cancel a blur of the image, the blur resulting from the vibration applied to the optical system, wherein the vibration signal output unit comprises:
   a first vibration sensor that has less drift than a second vibration sensor and detects a first vibration of a lower frequency region in an entire frequency region of the vibration applied to the optical system and outputs the vibration signal including a first vibration signal corresponding to the first vibration;
   the second vibration sensor that has a better frequency characteristic than the first vibration sensor and detects a second vibration of a higher frequency region in the entire frequency region of the vibration applied to the optical system and outputs the vibration signal including a second vibration signal corresponding to the second vibration; and
   a signal synthesizing unit that performs:
      obtaining the first vibration signal from the first vibration sensor;
      obtaining the second vibration signal from the second vibration sensor; and
      synthesizing the vibration signal from the first and second vibration signals, the vibration signal corresponding to the entire frequency region of the vibration applied to the optical system.

2. The image blur correcting device according to claim 1, wherein each of the first and second vibration sensors is an angular velocity sensor that outputs an angular velocity signal as the vibration signal, the angular velocity signal showing an angular velocity of the vibration applied to the optical system.

3. The image blur correcting device according to claim 1, wherein the image displacing unit displaces an image blur correcting lens disposed in the optical system so as to displace the image.

4. The image blur correcting device according to claim 2, wherein the lower frequency region of the first vibration is a lower region than a switching frequency, the higher frequency region of the second vibration is a higher region than the switching frequency, and the signal synthesizing unit comprises a cut-off frequency changing unit that changes the switching frequency.

5. The image blur correcting device according to claim 4, wherein the switching frequency changing unit changes the switching frequency on the basis of a magnitude of the vibration applied to the optical system.

6. The image blur correcting device according to claim 5, wherein the switching frequency changing unit detects the magnitude of the vibration applied to the optical system on the basis of the vibration signal obtained from the first vibration sensor.

7. The image blur correcting device according to claim 5, wherein the switching frequency changing unit decides that the magnitude of the vibration applied to the optical system is one of a magnitude evaluated to have no vibration and a magnitude evaluated to have a vibration, and in the case of the magnitude evaluated to have no vibration, the switching frequency is made to be higher as compared with the magnitude decided to have the vibration.

8. The image blur correcting device according to claim 4, wherein the image displacing unit displaces an image blur correcting lens disposed in the optical system so as to displace the image.

* * * * *